United States Patent [19]
Kodaira et al.

[11] Patent Number: 6,043,823
[45] Date of Patent: *Mar. 28, 2000

[54] DOCUMENT PROCESSING SYSTEM WHICH CAN SELECTIVELY EXTRACT AND PROCESS REGIONS OF A DOCUMENT

[75] Inventors: Naoaki Kodaira, Kawasaki; Hiroaki Kubota, Kamakura, both of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/682,007

[22] Filed: Jul. 16, 1996

[30] Foreign Application Priority Data

Jul. 17, 1995 [JP] Japan ................................. 7-180442
Feb. 22, 1996 [JP] Japan ................................. 8-034702

[51] Int. Cl.⁷ .................................................. G06T 3/00
[52] U.S. Cl. ............................................... 345/433
[58] Field of Search ................................ 395/133–139; 345/433–439

[56] References Cited

U.S. PATENT DOCUMENTS 5,471,549  11/1995  Kurosu et al. .................... 382/290

OTHER PUBLICATIONS

"OmniPage Professional" Tutorial, 1993.

*Primary Examiner*—Almis R. Jankus
*Attorney, Agent, or Firm*—Oblon, Spivak, McClelland, Maier & Neustadt, P.C.

[57] ABSTRACT

A document processing apparatus includes a division section for dividing a document image into a plurality of regions or connection components. A recognition section recognizes the type of a region in units of divided regions and edit section edits region data while displaying the recognition result. A shaping section then shapes the document image by using the edited region data.

18 Claims, 33 Drawing Sheets

| POSITION | SIZE | SHAPE | STRUCTURE | DENSITY DISTRIBUTION | RECOGNITION RESULT |
|---|---|---|---|---|---|
| INTERNAL | A<y<B | — | UNIFORM | — | CHARACTER REGION |
| UPPER | A<y<B | LATERAL ELONGATE | UNIFORM | — | TITLE REGION |
| — | y<C | LATERAL ELONGATE / VERTICAL ELONGATE | — | NON | UNDERLINE / LINE REGION |
| INTERNAL | D<y<E | RECTANGLE | EQUAL INTERVAL CHANGE | NON | TABLE REGION |
| INTERNAL | D<y<E | RECTANGLE | CHANGE EXIST | — | LINE REGION |
| — | D<y<E | RECTANGLE | UNIFORM | CONTRAST | PHOTOGRAPH REGION |
| INTERNAL | D<y<E | RECTANGLE | LARGE CHANGE | — | GRAPH REGION |

| REGION NO. | VERTICAL POSITION | LATERAL POSITION | VERTICAL SIZE | LATERAL SIZE | TYPE | IMPORTANCE |
|---|---|---|---|---|---|---|
| 1 | 271 | 52 | 333 | 84 | TITLE | 10 |
| 2 | 55 | 176 | 347 | 678 | CHARACTER | 8 |
| 3 | 439 | 160 | 342 | 304 | CHARACTER | 8 |
| 4 | 436 | 508 | 340 | 393 | DRAWING | 7 |
| 5 | 375 | 927 | 91 | 29 | CHARACTER | 5 |
| 6 | 23 | 245 | 140 | 12 | NOISE | 1 |
| 7 | 421 | 485 | 5 | 3 | NOISE | 0 |

FIG. 6

文書のタイトル
この文書はこの特許を説明するために作成されたものである。したがって、この文書はこの特許を説明するものであることがわかる。
ところで、この文書はこの特許を説明するものであって内容を問うものではない。まさに、この文書はこの特許を説明するものである。
なぜなら、この文書はこの特許を説明するものであるからである。
要するに、この文書はこの特許を説明するために作成されたもので、内容が問題とされるものではないことがわかる。いわばこの特許のための文書なのである。
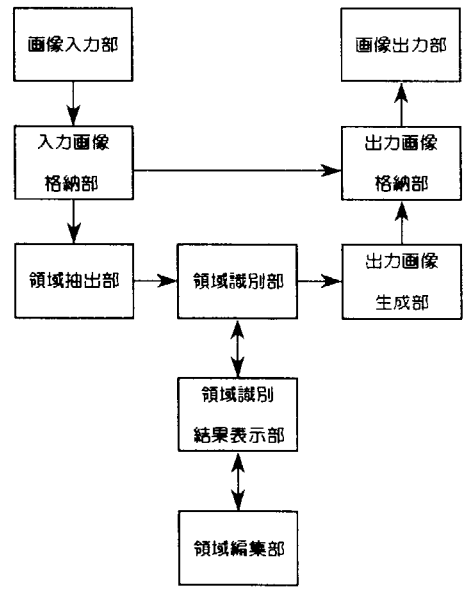
—1—
F I G. 7

| POSITION | SIZE | SHAPE | STRUCTURE | DENSITY DISTRIBUTION | RECOGNITION RESULT | |
|---|---|---|---|---|---|---|
| INTERNAL | A<y<B | — | UNIFORM | — | CHARACTER REGION | ~201 |
| UPPER | A<y<B | LATERAL ELONGATE | UNIFORM | — | TITLE REGION | ~202 |
| — | y<C | LATERAL ELONGATE/ VERTICAL ELONGATE | — | NON | UNDERLINE/ LINE REGION | ~203 |
| INTERNAL | D<y<E | RECTANGLE | EQUAL INTERVAL CHANGE | NON | TABLE REGION | ~204 |
| INTERNAL | D<y<E | RECTANGLE | CHANGE EXIST | — | LINE REGION | ~205 |
| — | D<y<E | RECTANGLE | UNIFORM | CONTRAST | PHOTOGRAPH REGION | ~206 |
| INTERNAL | D<y<E | RECTANGLE | LARGE CHANGE | — | GRAPH REGION | ~207 |
| INTERNAL | Wa±wa<x Ha±ha<y | RECTANGLE | CHANGE EXIST | — | BLACK FRAME NOISE REGION | ~208 |
| END OF DOCUMENT | Wa±wa<x Ha±ha<y | — | CHANGE EXIST | — | OUTER EDGE NOISE REGION | ~209 |

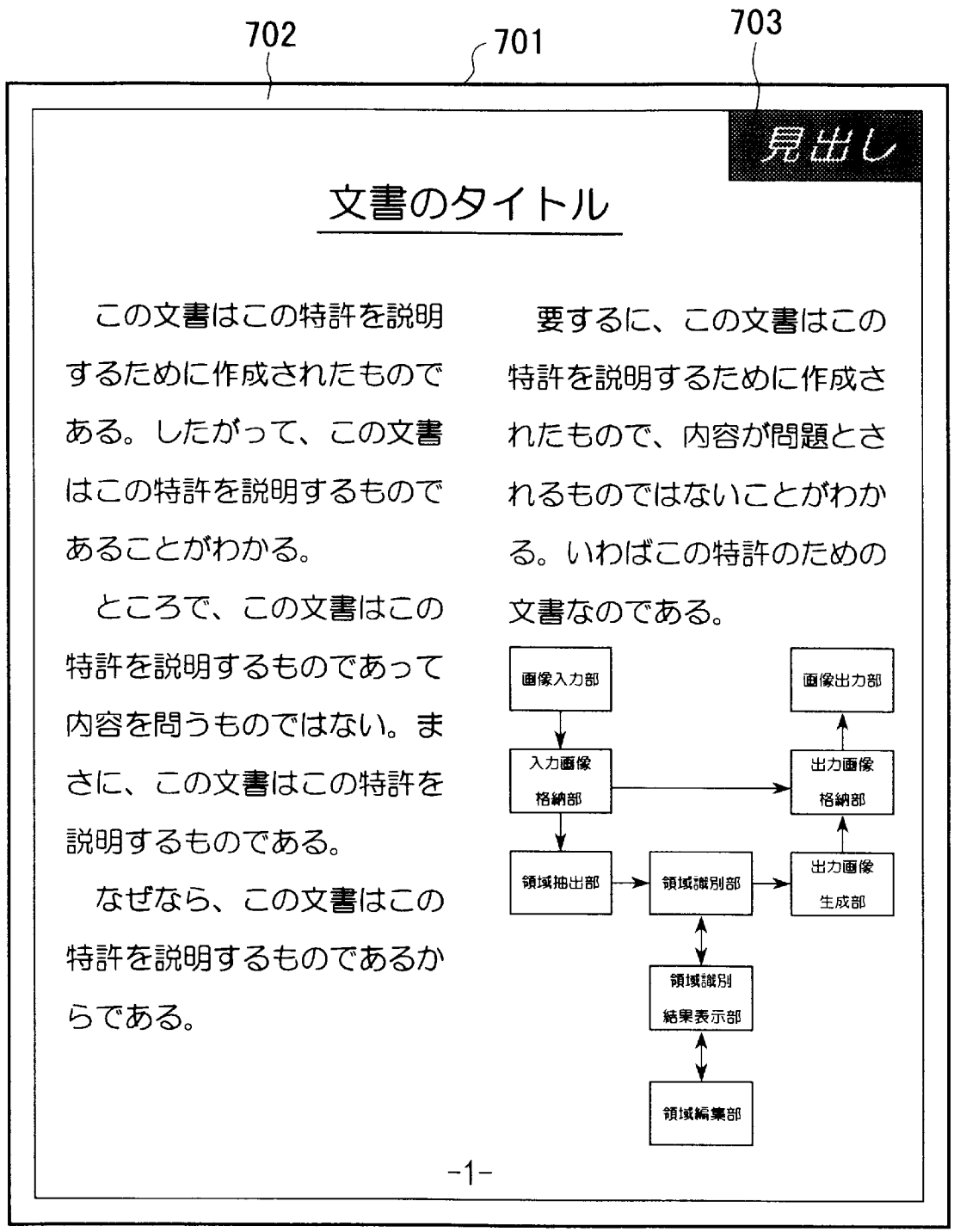
F I G. 17

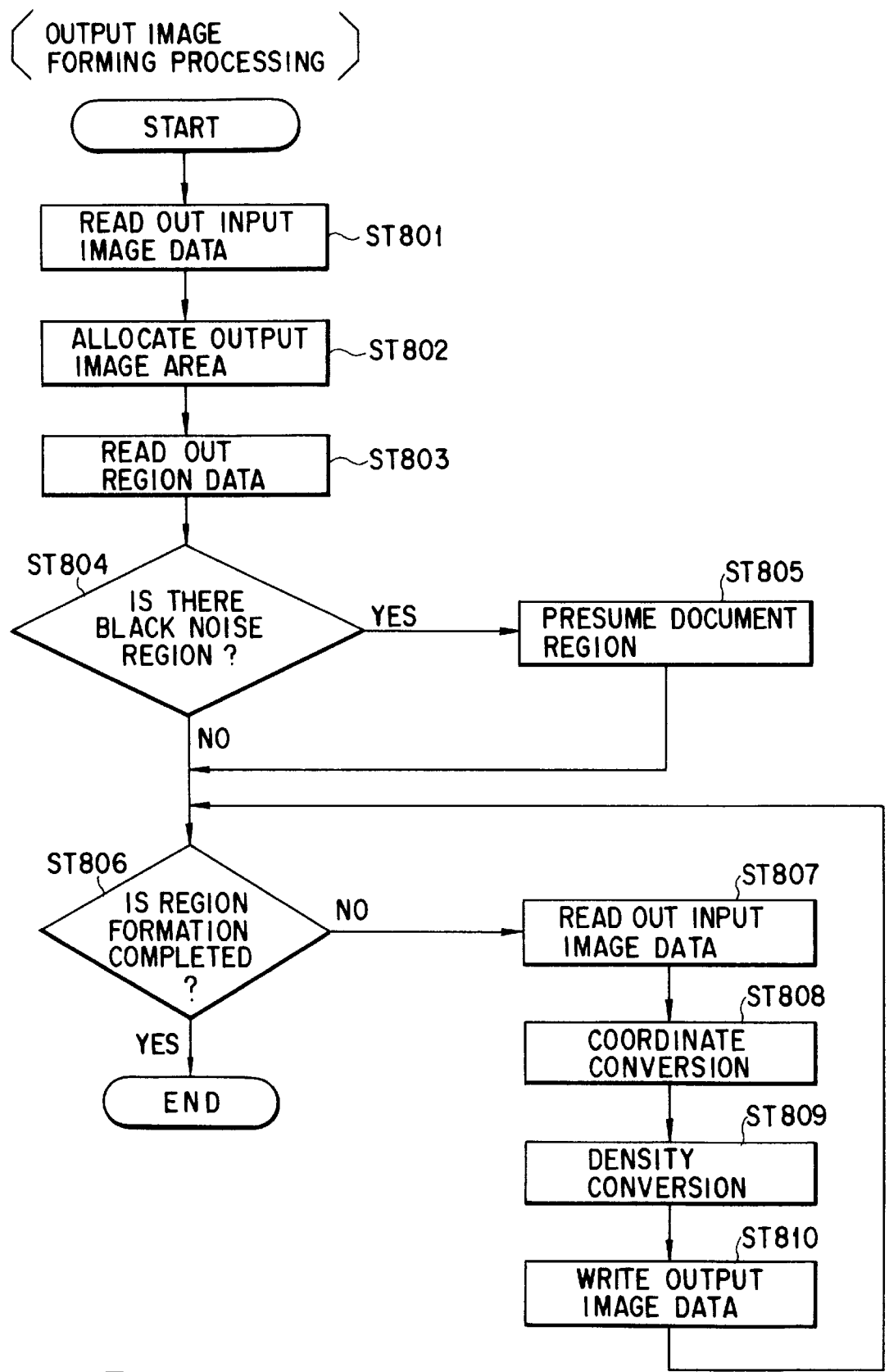
F I G. 19

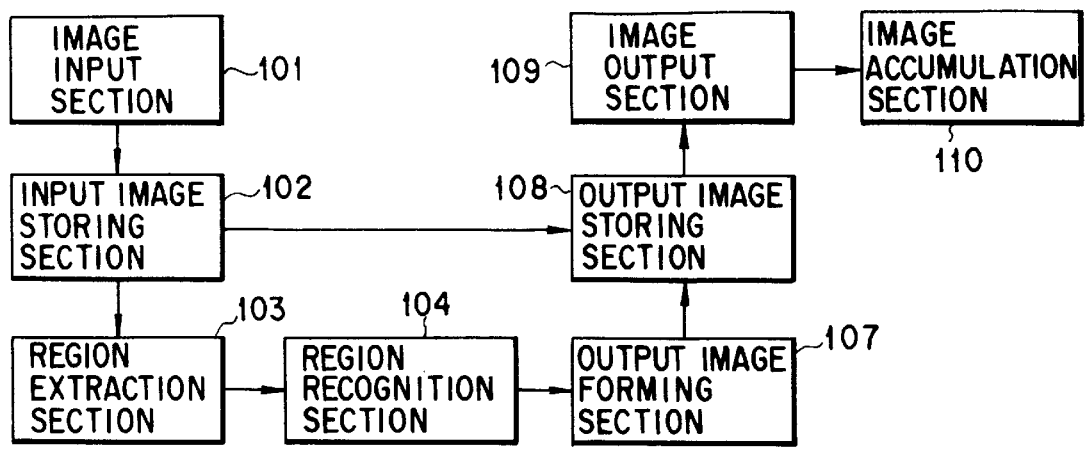
F I G. 22
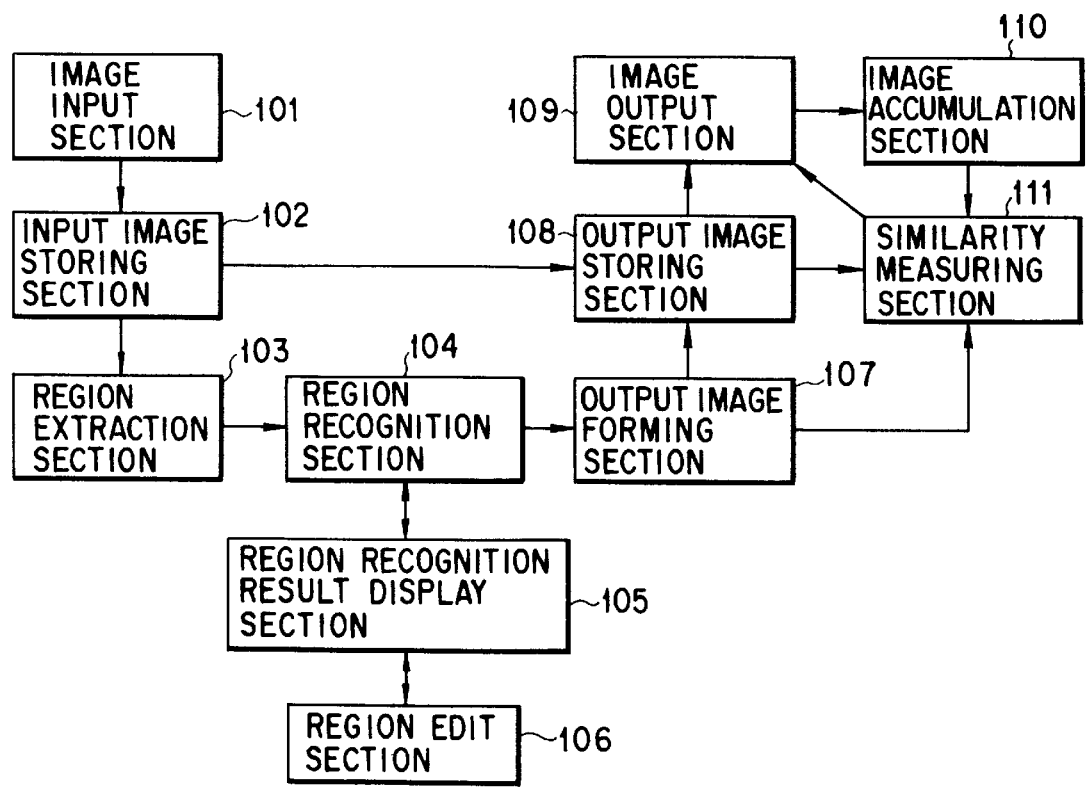
F I G. 24

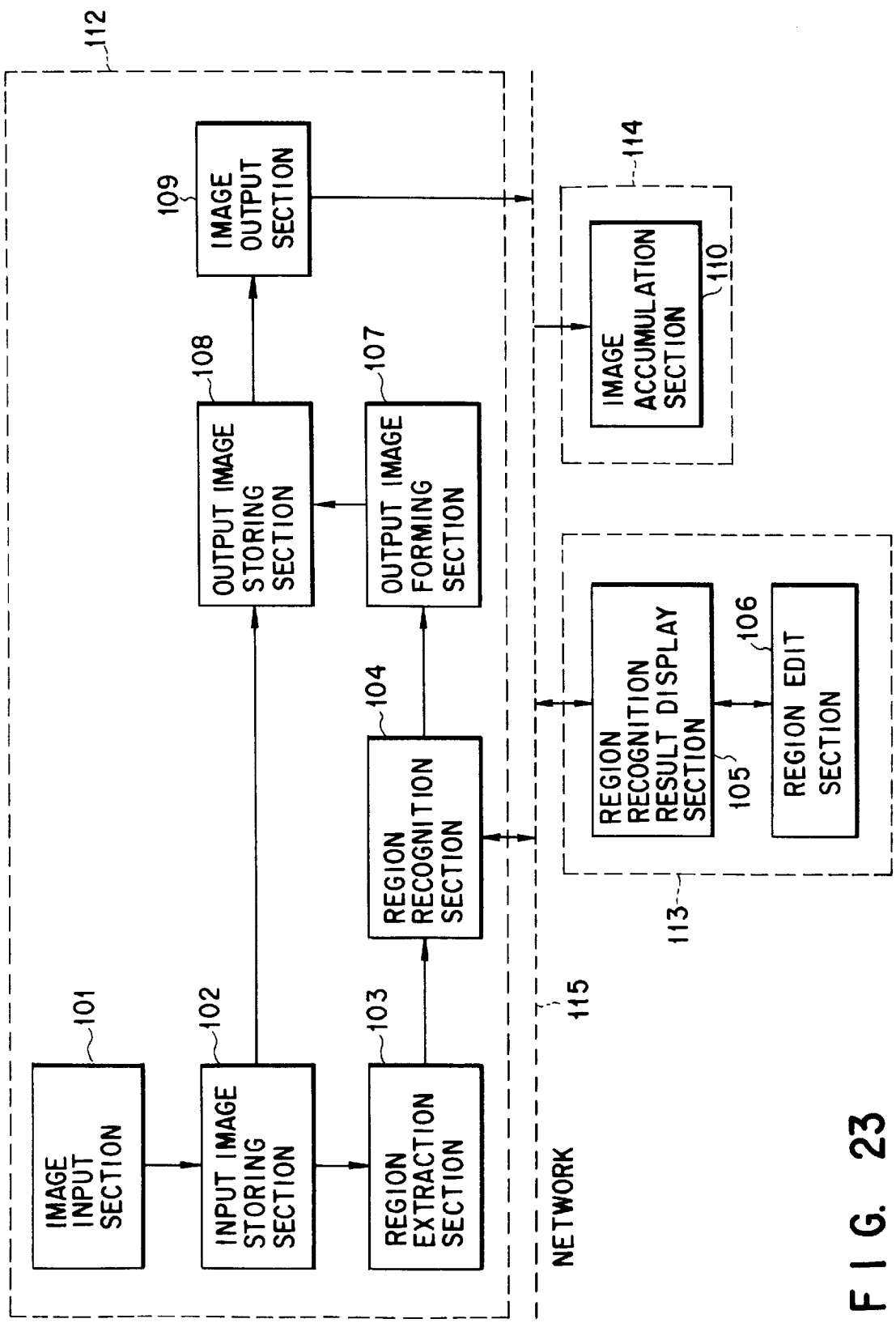
F I G. 23

別の文書のタイトル

この別の文書はこの特許を詳しく説明するために追加作成されたものである。したがって、最初の文書とは少々異なることがわかる。

ところで、この別の文書はこの特許を詳しく説明するものであって内容を問うものではないことはいうまでもない。どちらにしても、この文書はこの特許を詳しく説明するものである。

なぜなら、この文書はこの特許を詳しく説明するものであるからである。

要するに、この文書はこの特許を詳しく説明するための追加作成されたもので、内容が問題とされるものではないことが明らかである。

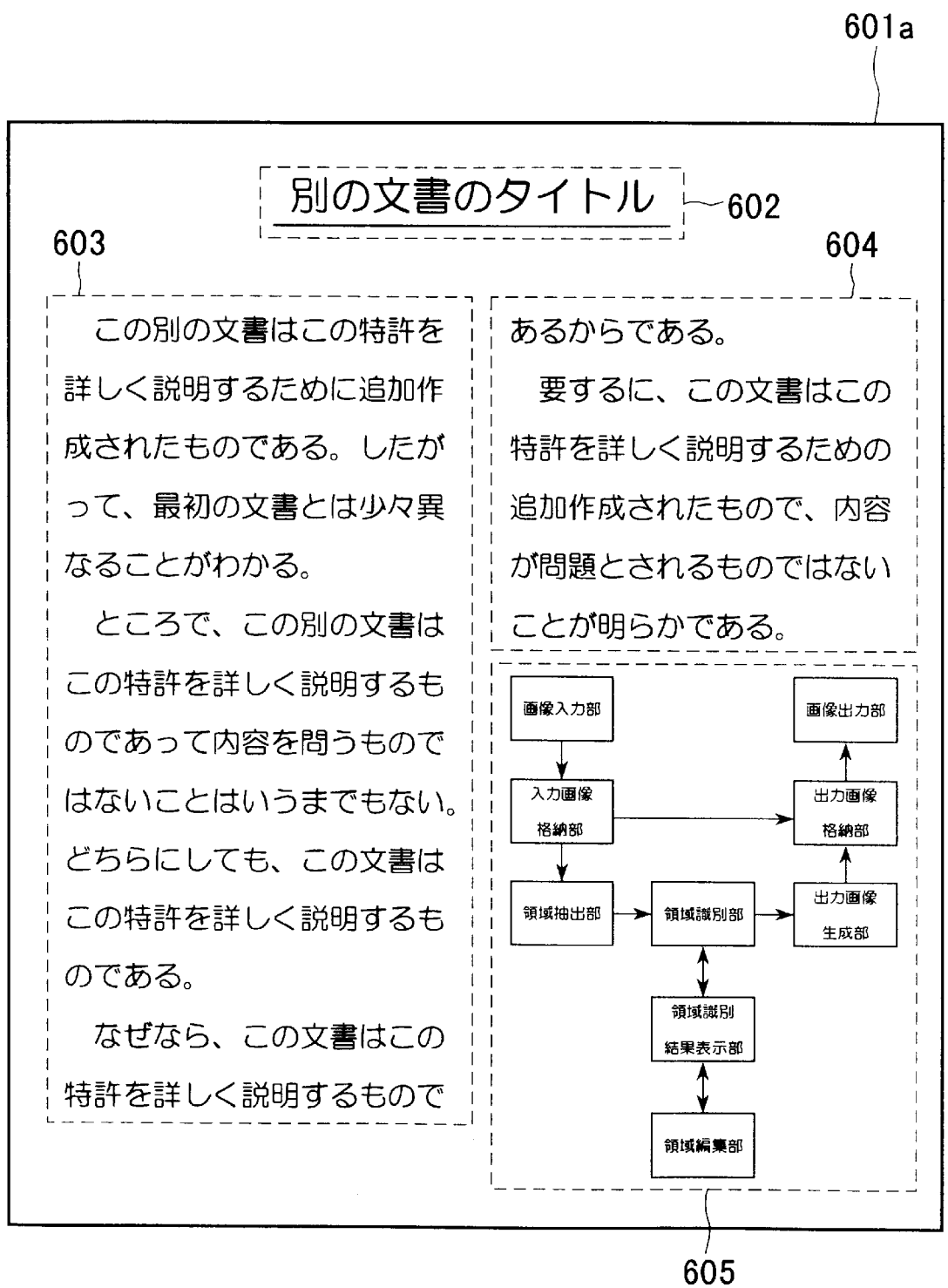
F I G. 26

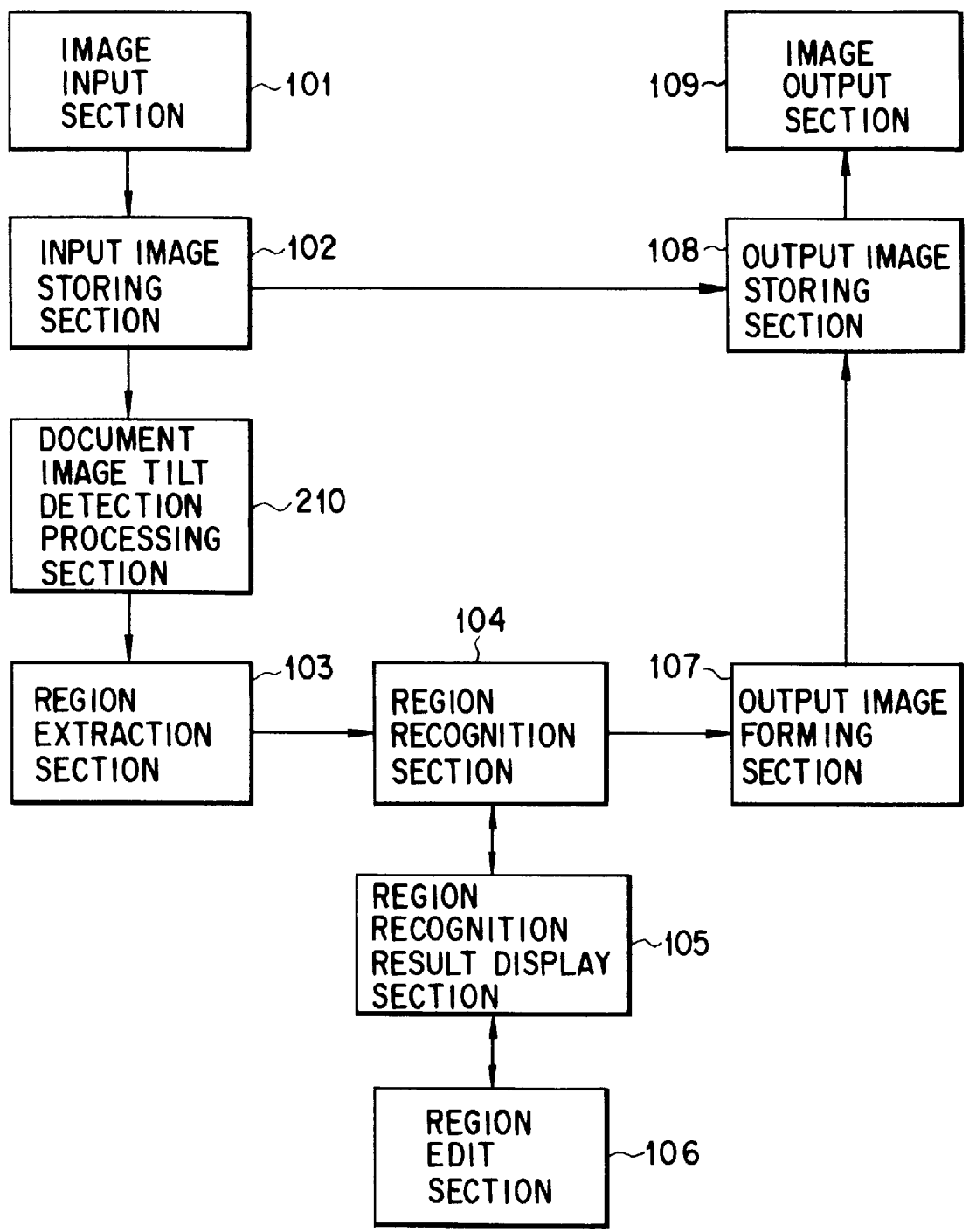
F I G. 29

| POSITION | SIZE | SHAPE | STRUCTURE | DENSITY DISTRIBUTION | REGION ATTRIBUTE |
|---|---|---|---|---|---|
| INTERNAL | A<X<B | — | UNIFORM | — | CHARACTER |
| — | C<X<D | LATERAL ELONGATE / VERTICAL ELONGATE | EXTREME LARGE CHANGE | — | LINE |
| INTERNAL | E<X<F | RECTANGLE | EQUAL INTERVAL CHANGE | — | TABLE REGION |
| INTERNAL | E<X<F | RECTANGLE | CHANGE EXIST | — | DRAWING |
| INTERNAL | E<X<F | RECTANGLE | UNIFORM | CONTRAST | PHOTOGRAPH REGION |

FIG. 35

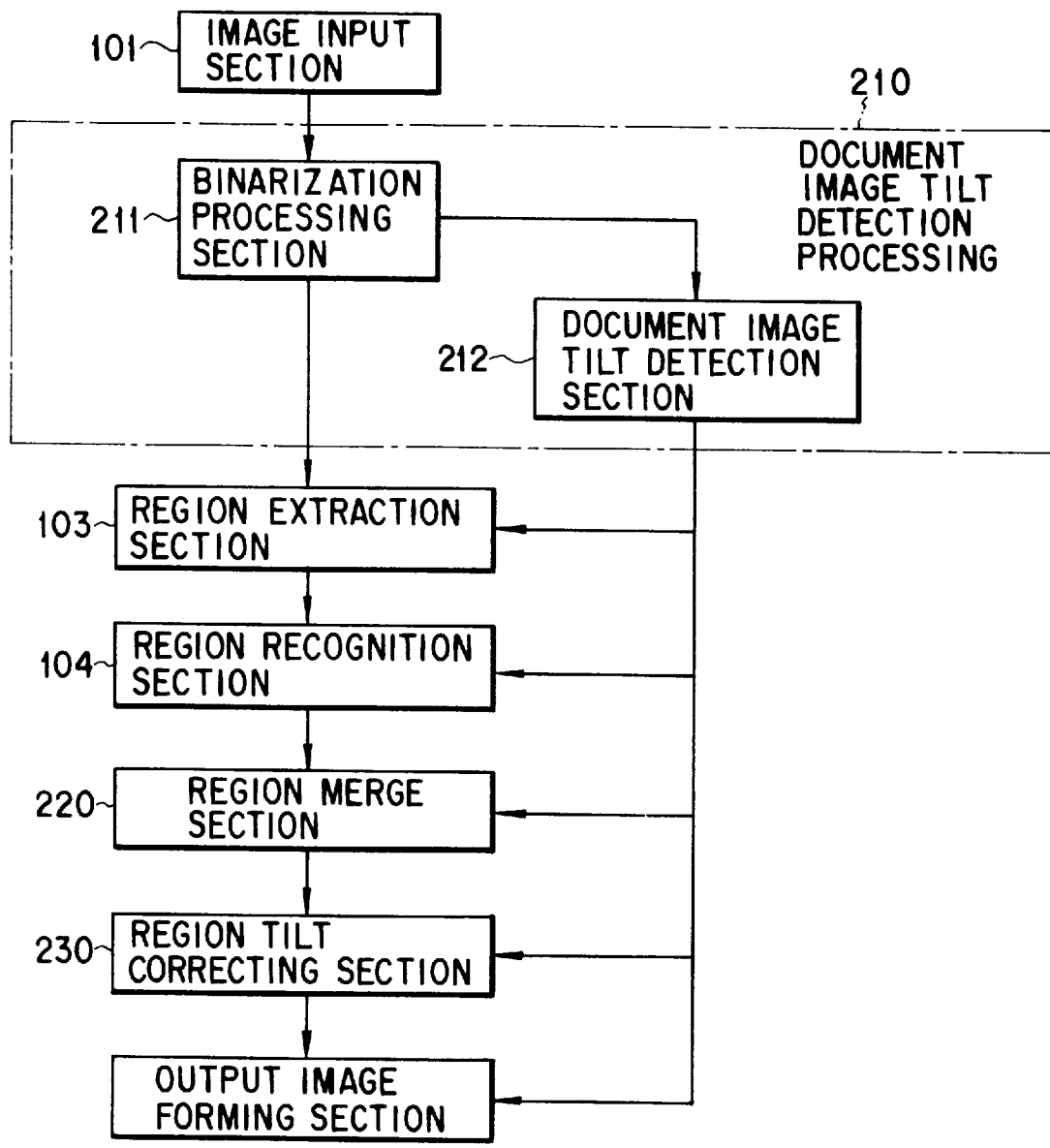
F I G. 42

DOCUMENT PROCESSING SYSTEM WHICH CAN SELECTIVELY EXTRACT AND PROCESS REGIONS OF A DOCUMENT

BACKGROUND OF THE INVENTION

1. Field of the Invention

The present invention relates to a document processing apparatus and method for reading out a document (original) to copy the image as a hard copy or convert the image into image data and store the image data.

2. Description of the Related Art

There are a technique of reading out a document (original) as image data to output the hard copy of the image data and a technique of storing image data as an image file. The former is used in the fields of image readers of copy machines or personal computers. The latter is used for filing devices or databases.

When such a conventional image processing apparatus is to read out a document as image data and copy the image data as a hard copy, or convert a document image into image data and store the image data, the apparatus generally processes a page (a sheet of paper) of the document original as a unit for a document in regular size.

More specifically, a document includes, as contents on its sheet surface, various data such as titles, texts, illustrations, drawings, and photographs laid out on the sheet surface. However, when all images on the document are to be processed together to copy the document, or converted into image data and stored, necessary and unnecessary portions of the document cannot be separated.

In addition, a method of recognizing the layout of a document is only used to positively search a text region. Although the text region can be detected, it is impossible to separate necessary and unnecessary portions and output or store only the necessary portions as a document image.

SUMMARY OF THE INVENTION

It is, therefore, an object of the present invention to provide a document processing apparatus which allows to extract a title, text, illustration, drawing, or photograph region from a document image including various data including the title, text, illustration, drawing, and photograph and independently store the image data or independently correct the image data to output a hard copy.

According to the present invention, there is provided a document processing apparatus comprising a region extraction section for extracting a plurality of specific regions having respective characteristics from a document image read out as image data, a region recognition section for recognizing the regions extracted by the region extraction section on the basis of the respective characteristics, a recognition result display for displaying a recognition result from the region recognition section, a region edit section for editing the recognition result, an output image forming section for forming an output image corresponding to an edit result from the region edit section or the recognition result, and an image output section for outputting the image formed by the output image forming section.

The region recognition section has a function of recognizing a plurality of regions on the basis of the characteristics and classifying and dividing the plurality of regions in accordance with the recognition result. The region recognition section also has a function of, when a region is recognized as a noise region, separating and deleting the noise region.

When a document is to be copied or converted into image data and stored, upon receiving the document image, elements included in the input image are extracted as regions. When the importance of each region in the document is recognized or corrected, necessary portions and unnecessary portions can be properly separated and processed. With this processing, the document can be copied or stored after handwritten patterns or noise included in the document, the shade of the document, and other unnecessary portions are removed.

Upon receiving a document image, elements included in the input image are extracted as regions. The importance of each region in the document is recognized or corrected, and only necessary portions are stored as independent data in units of elements. With this processing, data obtained from the input image can be reused for another document. At the same time, since only necessary portions are stored, the storing region can be effectively saved.

When a region is to be stored as data, the difference between the region and an already recorded region is measured. With this processing, a database can be constituted without storing the already recorded data again. At the same time, a search operation can be efficiently performed, and the storing region can be effectively saved.

As described above, according to the present invention, a document is divided into regions in units of constituent elements. Region data for determining necessity of each region is recognized and edited with reference to region recognition data displayed on the recognition result display section. With this processing, only necessary portions can be easily extracted from the document. In addition, separation of necessary regions and unnecessary regions can be automatically or easily realized. Furthermore, constituent elements of the document, i.e., texts, drawings, and the like can be stored as components and easily reused.

When a document is to be copied or converted into image data and stored, and the input document has a tilt, only necessary regions such as texts and drawings in the document are output while unnecessary regions such as noise regions are deleted.

For this purpose, according to the present invention, there is provided a document processing apparatus comprising a tilt detector for detecting the tilt of an input document image in region recognition, a region extraction section for extracting a connection component region of the document image along the horizontal or vertical direction with respect to the tilt detected by the tilt detector, a region recognition section for measuring the shape of the connection component region on the basis of the region extraction section, thereby recognizing an attribute of the region, and an output image forming section for performing deformation or density conversion on the basis of the recognized attribute to form output image data.

When a document is to be copied or converted into image data and stored, upon receiving the document image, the tilt of the input image is detected. An element included in the input image is extracted as a region along the horizontal or vertical direction with respect to the tilt. When the attribute of each region as a document element is recognized, necessary portions and unnecessary portions can be properly separated and processed. With this processing, the document can be copied or stored after handwritten patterns or noise included in the document, the shade of the document, and other unnecessary portions are removed. In addition, the toner or storing region can be effectively saved in the copy operation.

In the apparatus of the present invention, the tilt of an input document is detected. A connection black pixel rectangular region along the horizontal or vertical direction with respect to the tilt is formed. An attribute such as a character, drawing, photograph, or noise region is recognized for each region. When the input document image has a tilt, and the tilt is to be corrected, the extracted regions are subjected to tilt correction. Therefore, only necessary regions can be corrected at a high speed.

More specifically, according to the present invention, instead of performing region recognition after tilt correction of the document image, region recognition is performed on the basis of rectangular region data having a tilt, so that high-speed processing can be performed.

Upon receiving a document image, the tilt of the input image is detected. An element included in the input image is extracted as a region along the horizontal or vertical direction with respect to the tilt. The attribute of each region as a document element is recognized. With this processing, regions having the same attribute can be merged to decrease the number of storing regions.

More specifically, even when a corrected image is to be output, correction is performed for only regions which require tilt correction, so that high-speed tilt correction can be performed. When the entire image is to be corrected, a new storing region (memory) is required. However, in the present invention, this storing region can be omitted.

In the system of the present invention, a document image is read out by an image input section and temporarily stored in an input image storing section as input image data. Subsequently, on the basis of the data situation of the temporarily stored image data, a region extraction section extracts, as a region, a unit in which characters or graphics are physically or logically connected. A region recognition section measures the amount of characteristics such as the position on the corresponding image, size, shape, structure, and density distribution of the extracted region. The measurement result is recognized on the basis of predetermined rules, thereby recognizing the type of each region and the importance in the document.

The recognized region data is displayed on a region recognition result display. In an edit mode, the user can perform an edit operation of region data with reference to the displayed contents by using a region edit section, so that the user can satisfactorily edit the region data. The edit result can be output as image data.

As described above, according to the system of the present invention, upon receiving a document image, image elements of different types such as a title region, a text region, a drawing region, a page region, and a photograph region included in the input image are extracted as regions. The importance of each region in the document is recognized in accordance with predetermined rules, or the recognition result is corrected. With this processing, necessary portions and unnecessary portions can be properly separated and processed.

Therefore, when document image data is to be filed, or when a hard copy is to be output, the user can satisfactorily edit or adjust the image data for final use and open up new utilization and application fields.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a view showing rules for determining the types of regions, which are used in the processing for determining the types of regions shown in FIG. 4B;

FIG. 6 is a view showing rules for determining the importance of regions, which are used in region recognition processing of the document processing apparatus according to the present invention;

FIG. 7 is a view showing an example of a document image to be processed by the document processing apparatus according to the present invention;

FIGS. 15A to 15D are views showing examples of output images to be formed by output image forming processing of the document processing apparatus of the second embodiment;

FIG. 16 is a view showing rules for determining the types of regions, which are used in region recognition processing of the document processing apparatus according to the present invention;

FIG. 17 is a view showing an example of a document image to be input to a document processing apparatus according to the third embodiment of the present invention;

FIG. 19 is a flow chart showing the detailed sequence of output image forming processing by the output image forming section of the document processing apparatus according to the third embodiment;

FIG. 22 is a block diagram of a document processing apparatus according to the fourth embodiment of the present invention;

FIG. 23 is a block diagram of a document processing apparatus according to the fifth embodiment of the present invention;

FIG. 24 is a block diagram of a document processing apparatus according to the sixth embodiment of the present invention;

FIG. 26 is a view showing an example of a display screen of region data display processing performed by the region recognition result display section of the document processing apparatus according to the sixth embodiment;

FIGS. 28A to 28D are views showing examples of output images to be formed with output image forming processing of the document processing apparatus according to the sixth embodiment;

FIG. 29 is a block diagram of a document processing apparatus according to the seventh embodiment of the present invention;

FIG. 35 is a view showing elements for determining a region attribute, which are used in region recognition processing of the document processing apparatus according to the present invention;

FIG. 42 is a block diagram schematically showing the region recognition function element portion of a document processing apparatus according to the ninth embodiment of the present invention.

DETAILED DESCRIPTION OF THE PREFERRED EMBODIMENTS

Figure 1:
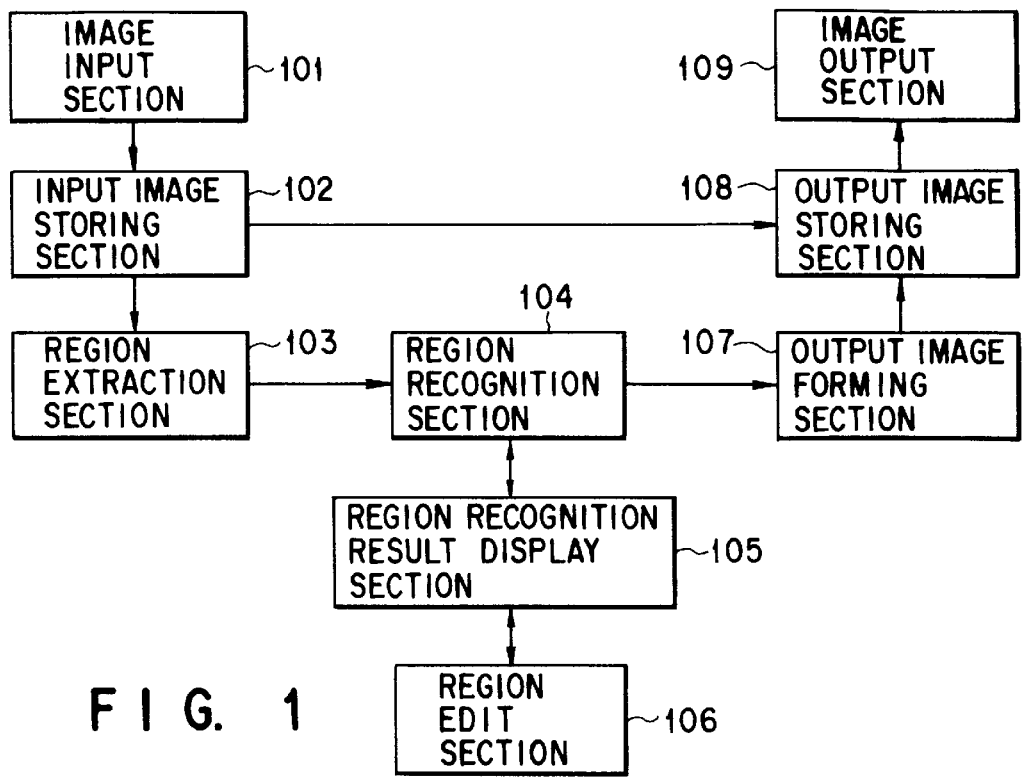
FIG. 1 is a block diagram of a document processing apparatus according to an embodiment of the present invention.

In an embodiment shown in FIG. 1, an image input section 101 is a unit for inputting image data, i.e., a unit for receiving image data of a given document (original on which contents are printed) from an image input device such as an image scanner serving as a unit for reading out an image and converting the image into image data. The image input section 101 may have an arrangement including the image input device itself or an arrangement for only receiving an image given by the image input device, as a matter of course.

An input image storing section 102 is a memory for temporarily holding data and temporarily storing the image data read out by the image input section 101. A region extraction section 103 divides the image data stored in the input image storing section 102 into regions wherein characters or graphics are physically or logically connected and extracts each region.

A region recognition section 104 (to be described later in detail) measures the characteristics of a region extracted by the region extraction section 103, i.e., the position, size, shape, and the like of the region, to recognize the type or importance of the region.

A region recognition result display section 105 is a display unit for displaying the image data stored in the input image storing section 102 together with the recognition data of the region recognized by the region recognition section 104. A region edit section 106 is a user interface for editing and correcting the region data displayed on the region recognition result display section 105. An output image forming section 107 changes the image in the input image storing section 102 by using the region data recognized by the region recognition section 104 or region data edited by the region edit section 106, thereby forming an output image.

An output image storing section 108 temporarily stores the output image formed by the output image forming section 107. An image output section 109 outputs the output image stored in the output image storing section 108 to a printer or an external memory.

Figure 2:
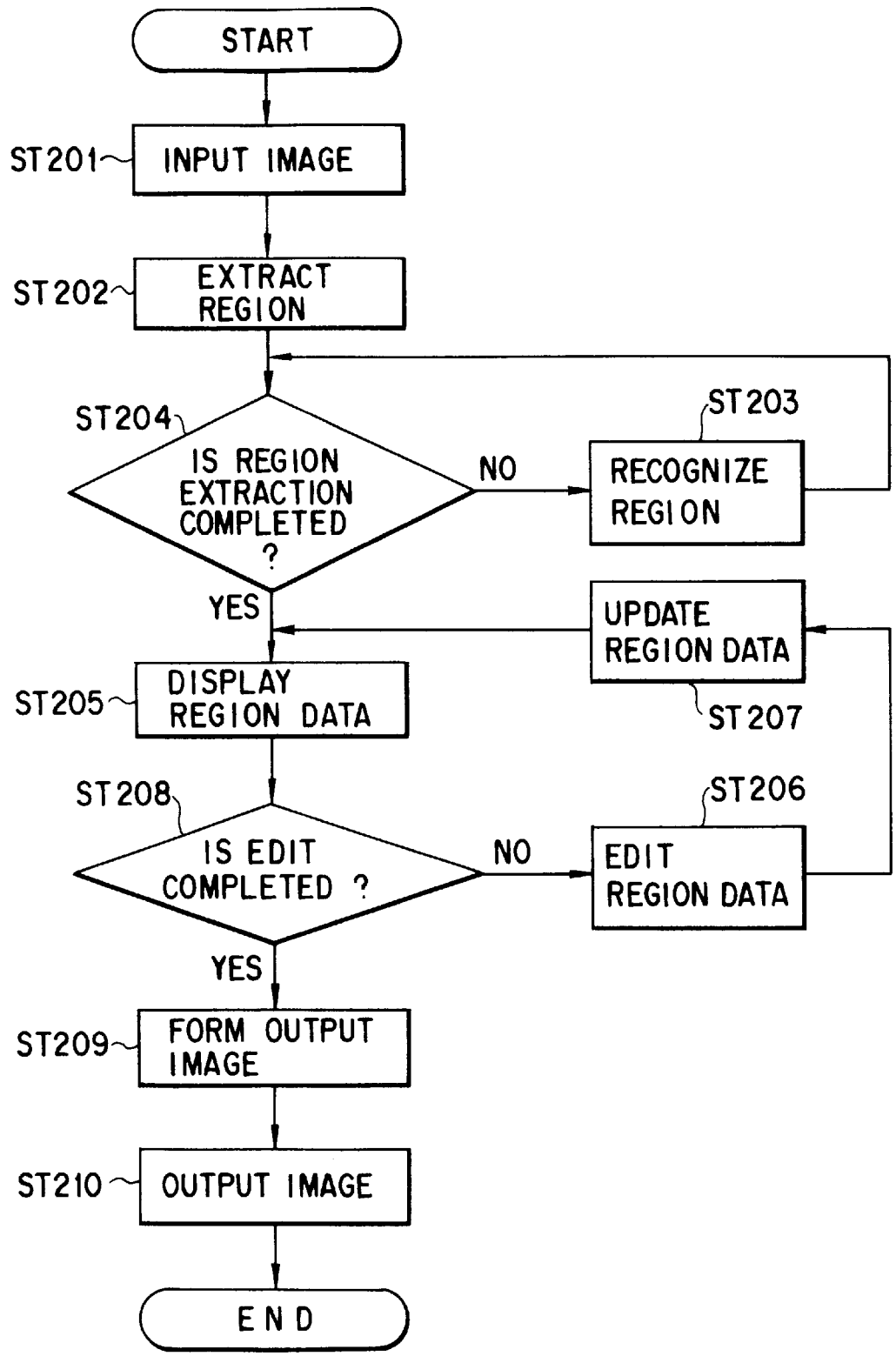
FIG. 2 is a flow chart showing an example of the sequence of document processing of the document processing apparatus shown in FIG. 1.

FIG. 2 is a flow chart showing an example of document processing of the apparatus according to the present invention having the arrangement shown in FIG. 1. The sequence of processing of the document processing apparatus according to the present invention will be described below with reference to this flow chart and the block diagram of FIG. 1.

A document image is received by the image input section 101 (ST201). More specifically, the image is read out from the document by the image input device such as a scanner, converted by the image input section 101 into image data, and temporarily stored in the input image storing section 102 as input image data.

Upon receiving the image data (input image data which is temporarily stored in the input image storing section 102), the region extraction section 103 extracts, as a region, a unit in which characters or graphics are physically or logically connected (ST202) as described after. Processing performed by the region extraction section 103 will be described later in detail with reference to FIG. 3.

The region recognition section 104 measures the amounts of characteristics extracted by the region extraction section 103, such as the position on the corresponding image, size, shape, structure, and density distribution of the region, thereby recognizing the type or importance of the region in the document in accordance with predetermined rules (ST203) as described after.

Upon completion of recognition processing of all extracted regions (ST204), these pieces of recognition region data are displayed on the region recognition result display section 105 serving as a display unit such as a monitor display (ST205).

The user edits the region data with reference to these data (ST206). After the region data edit operation (ST206) by the user, the region data is updated (ST207), and display of the region data also changes in accordance with updating processing (ST205). This sequence is repeated until the correction operation by the user is completed (ST208).

Upon completion of the correction operation by the user, the output image forming section 107 performs output image forming processing (ST209). More specifically, after the edit operation, the output image forming section 107 changes the image data in the input image storing section 102 by using the corrected region data when correction has been performed, or recognized region data when correction has not been performed, thereby forming an output image.

Finally, the image output section 109 outputs the formed output image to a printer or an external memory (ST210), thereby ending the series of processing.

The processing operation of the system of the present invention has been briefly described above. Next, processing of the respective elements will be described below in detail.

[Details of Processing of Region Extraction Section 103]

Figures 3, 4A:
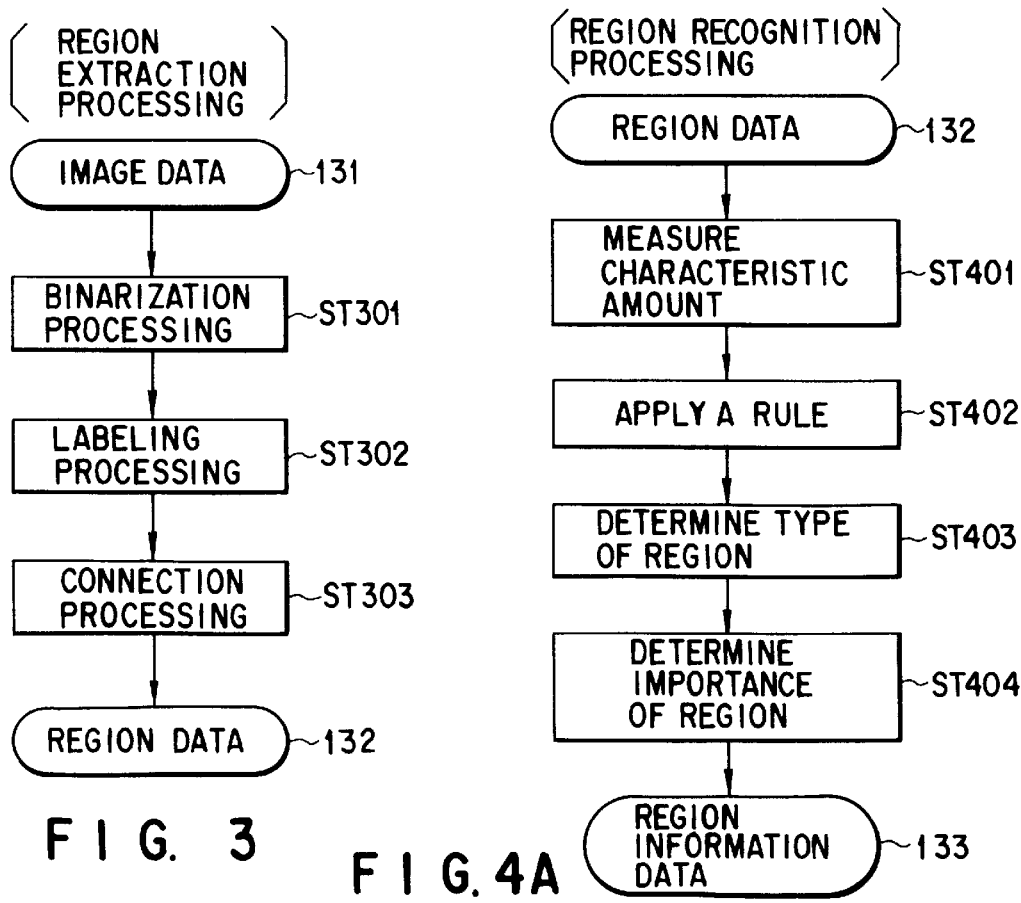
FIG. 3 is a flow chart of region extraction processing of the document processing apparatus shown in FIG. 1.
FIG. 4A is a flow chart of region recognition processing of the document processing apparatus shown in FIG. 1.

FIG. 3 is a flow chart showing details of an example of region extraction processing of the region extraction section 103 of the document processing apparatus of the present invention, which corresponds to region extraction processing in step ST202 in FIG. 2.

To perform region extraction processing, the region extraction section 103 performs binarization processing of all pixels of input image data 131 (image data of one frame (one page) stored in the input image storing section 102) (ST301). For example, a threshold value T for binarization is set in advance. Pixels with pixel values smaller than the threshold value T are set to be "1", and the remaining pixels are set to be "0". More specifically, dark portions of the document image are set to be "1", and the remaining portions are set to be "0".

Subsequently, labeling processing is performed for pixels having a pixel value of "1" after binarization processing (ST302). This processing is performed for the purpose of uniting adjacent or connected pixels with the pixel value of "1", and the pixel value is converted such that each unit (called a connection component) has a different pixel value. This processing can be realized using a technique described in, e.g., a reference: Junichi Hasegawa et al., "Basic Technique of Image Processing: <Introduction>", Gijutsu Hyoronsha, pp. 47–49 (1986).

Connection processing is performed for the labeled image data, in which two or more connection components are further connected to each other and merged into one connection component (ST303).

Connection is performed in the following manner.

Two connection components are arbitrarily extracted from the extracted connection components, and the distance therebetween is measured. The minimum distance between pixels is measured as the distance between the two connection components. When this measured distance is smaller than a predetermined threshold value D, the two components are connected as one connection component.

With the above processing, the region extraction section 103 outputs the extracted connection components one by one as a region to form region data 132. This region data 132 is transferred to the region recognition section 104 and subjected to region recognition processing.

Processing of the region extraction section 103 has been described above in detail. Processing of the region recognition section 104 will be described below in detail.

[Details of Processing of Region Recognition Section 104]

FIG. 4A is a flow chart showing details of region extraction processing of the region recognition section 104 of the document processing apparatus of the present invention, which corresponds to region recognition processing in step ST203 in FIG. 2.

Upon receiving the region data 132 from the region extraction section 103, the region recognition section 104 performs processing of measuring the amounts of characteristics of each of the all extracted region data 132 (ST401).

With this characteristic amount measurement, at least one of "position of region on the image", "size of region", "shape of region", "structure of region", and "density distribution of region" is measured. An example of a method of measuring the characteristic amounts will be briefly described.

The "position of region on the image" is obtained by measuring the central position or center of gravity of each region. Both the points can be given by coordinate values along the lateral and vertical directions.

The "size of region" is obtained by measuring widths along the lateral and vertical directions. By multiplying the widths along the lateral and vertical directions, the size can be obtained. The width along the vertical direction is obtained as the difference between the coordinate values of the uppermost pixel in the region and those of the lowermost pixel. The width along the lateral direction is obtained as the difference between the coordinate values of the leftmost pixel in the region and those of the rightmost pixel.

The "shape of region" can be obtained on the basis of the ratio of the width along the vertical direction to that along the lateral direction. With this measurement, a characteristic representing a vertically elongated region, a laterally elongated region, an almost square region, or the like can be obtained.

The "structure of region" can be obtained by measuring projections along the lateral and vertical directions.

The "density distribution of region" is measured by forming the density value histogram of pixels in the region. In this case, measurement is performed with reference to image data before binarization.

With the above processing, the characteristic amounts can be measured.

Upon completion of characteristic amount measurement, predetermined rules are applied to determine the type of each region, i.e., a "character region", "title region", "underline region", "table region", "drawing region", "photograph region", or "graph region" (ST402 and ST403).

In this processing, rules as shown in FIG. 5 are set in advance, and the type of each region is determined with reference to these rules. In FIG. 5, as a rule set 201, the ranges or values of the characteristic amounts including the "position", "size", "shape", "structure", and "density distribution" are set for each type of region. In this case, a rule 202 for a "character region", a rule 203 for a "title region", a rule 204 for a "underline region", a rule 205 for a "table region", a rule 206 for a "drawing region", a rule 207 for a "photograph region", and a rule 208 for a "graph region" are recorded.

Rules for other regions can also be added. In addition, for a recorded region, the type of region can be determined in accordance with two or more rules. Referring to FIG. 5, a portion represented as "-" can have any characteristic amount measurement result. As for the rule 202 for determining a "character region", the "position on the image", "shape", and "density distribution" can have any values. However, if the "size" satisfies the condition that the width along the vertical direction is larger than A and smaller than B, and the "structure" is "equalization", this means that the region is a "character region".

The values of the respective characteristic amounts in FIG. 5 will be briefly described.

"Upper" of the "position" means that the region is "present at a portion above T% of the image". A set value T is set to be, e.g., 20%. "Internal" means that the region is "not present at the edge of the image". The "edge" is a range within a set value of U% from the corners of the image. The set value U is set to be, e.g., 10%. However, the value U may be changed in units of documents by obtaining the distribution of dark pixels on image data by measuring projections. For the "size", only a width y along the vertical direction is defined in FIG. 5, though a width x along the lateral direction can be simultaneously set. Set values A, B, C, D, and E are automatically determined from the size of the document image. The respective set values are evaluated on the basis of the number of pixels.

For the "shape", "lateral elongate" means that "the width along the lateral direction is V times larger than that along the vertical direction". For example, the set value V is set to be "2". In a similar manner, "vertical elongate" can be defined. At this time V≧1.

"Rectangle" means that the region is "neither laterally elongated nor vertically elongated". More specifically, the width along the lateral direction is smaller than V times that along the vertical direction and larger than 1/V times that along the vertical direction.

For the structure, "equivalent" means that "projections are almost equivalent". "Equal interval change" means that "the projection has a remarkable change and very fine peaks at intervals". "Large change" means that "the projection has a remarkable change and fine peaks". "Change exist" means that "the projection has a remarkable change and no characteristic peaks".

For a "density distribution", "contrast" means that "a change exists in contrast", and "non" means that "no change exists in contrast".

Figure 4B:
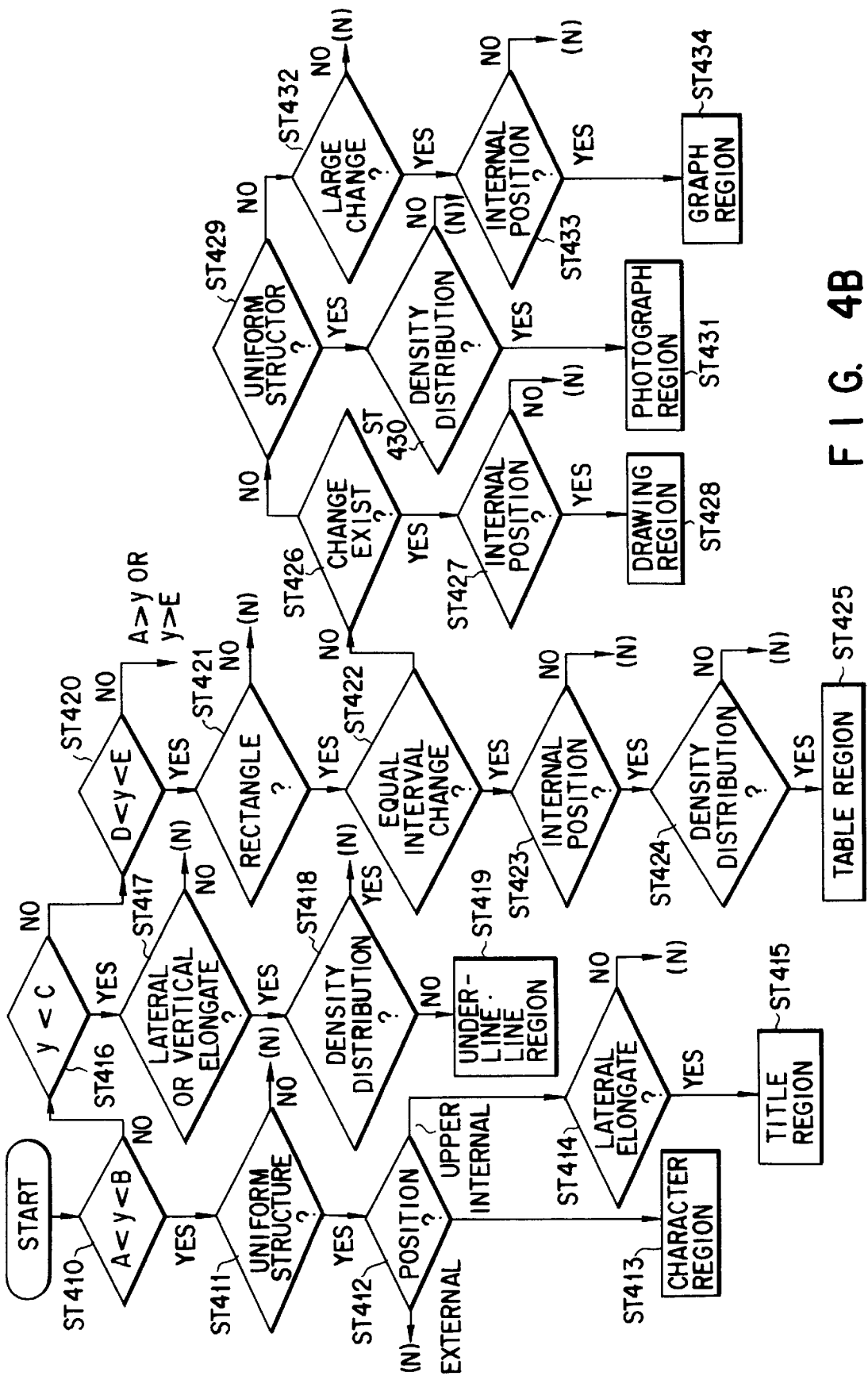
FIG. 4B is a flow chart of the processing for determining the types of regions in the region recognition processing shown in FIG. 4A.

There will now be described the step of determining the types of regions in detail referring to FIG. 4B.

When the type determining operation is started, it is determined whether the size y of the extracted region is A<y<B (ST410). If this determination is YES, it is determined whether the structure of the region is uniform (ST411). If this determination is YES, it is determined whether the position of the region is upper, internal or external. If the position of the region is internal, the region is recognized as a character region (ST413). If the position of the region is upper, it is determined whether the region is lateral elongate (ST414). If this determination is YES, the region is recognized as a title region (ST415).

If the step ST410 determines NO, it is determined whether the size y of the region is y<C (ST416). If this determination is YES, it is determined whether the region is lateral elongate or vertical elongate (ST417). If this determination is YES, it is determined whether the region has a density distribution. If this determination is NO, the region is recognized as an underline/line region (ST419).

If the step ST416 determines NO, it is determined whether the size y of the region is D<y<E (ST420). If this determination is YES, it is determined whether the region is rectangular (ST421). If this determination is YES, it is determined whether the structure of the region has an equal interval change (ST422). If this determination is YES, it is determined whether the position of the region is internal (ST423). If this determination is YES, it is determined whether the region has a density distribution (ST424). This determination is YES, the region is recognized as a table region.

If the step ST422 determines NO, it is determined whether a change exists in the structure of the region (ST426). If this determination is YES, it is determined whether the position of the region is internal (ST427). If this determination is YES, the region is recognized as a drawing region (ST428).

If the step ST426 determines NO, it is determined whether the region has a uniform structure (ST429). If this determination is YES, it is determined whether the region has a density distribution (ST430). If this determination is YES, the region is recognized as a photograph region (ST431).

If the step ST429 determines NO, it is determined whether the region has a large change (ST432). If this determination is YES, it is determined whether the position of the region is internal (ST433). If this determination is YES, the region is recognized as a graph region (ST434).

If the step ST420 determines NO, the size y of the region is determined to be A>y or y>E. In other words, the region is recognized as a region which do not satisfy the rule, e.g., a noise region indicated as (N) in FIG. 4B.

With the above method, the type of each region can be recognized on the basis of the characteristic amounts which are measured in units of regions. A region which cannot be recognized in accordance with the predetermined rule 201 can be defined as a "noise region".

The "importance" of each region in the document can be represented as a point on the basis of the recognized type of region (ST404). The importance can be appropriately set in correspondence with the purpose such that "8" is for a "character region", "10" is for a "title region", and "5" is for an "underline/line region". As the score becomes higher, the importance increases. Even for regions of the same type, the importance can be changed in accordance with the characteristic amount such as the size of region by increasing rules.

Particularly, for a "noise region" which is not shown in the rules of FIG. 5, the importance can be made low, and the score can be set within the range of about "0" to "4", in accordance with the characteristic amounts of the region. For example, importance "1" can be set for a region positioned at a corner of an image, and importance "0" can be set for a region in a very small size. This setting can be realized by setting rules similar to those in FIG. 5.

With the above operation, the type and importance of a region can be obtained as region information data 133, in addition to the characteristic amounts of the region. For the recognized region data, a table 251 as shown in FIG. 6 is prepared, so that the type and importance of the recognized region can be managed together with the characteristic amounts of the region (all measured characteristic amounts, though FIG. 6 shows only positions and sizes along the vertical and lateral directions).

Processing of the region recognition section 104 has been described above in detail. Processing of the region recognition result display section 105 will be described below in detail.

[Details of Processing of Region Recognition Result Display Section 105]

FIG. 7 is a view showing an example of a document image to be input to the document processing apparatus of the present invention. FIG. 6 shows a document image 501 including a document title with an underline, a text portion, and a drawing.

Figure 8:
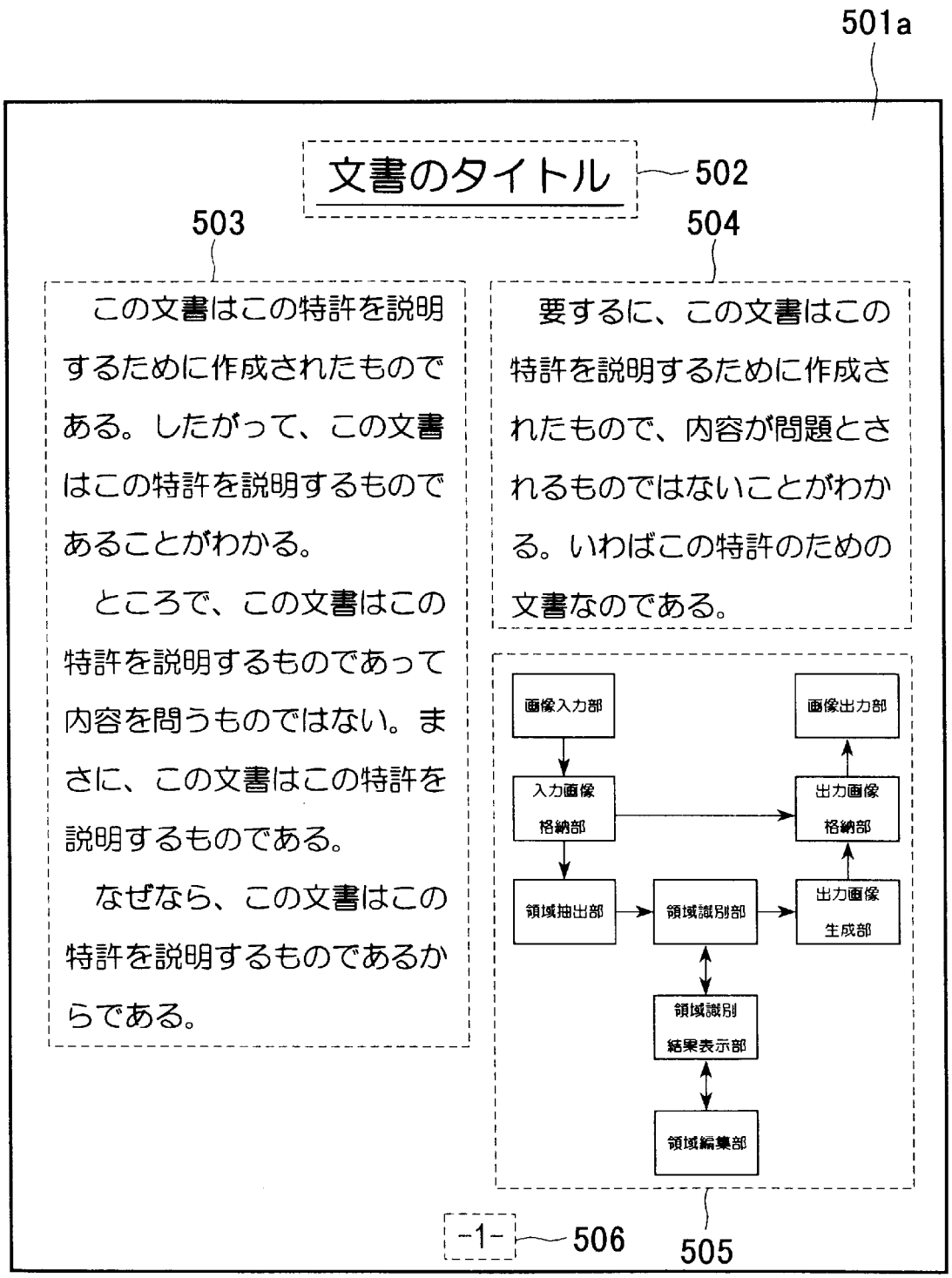
FIG. 8 is a view showing an example of region data to be output to the region recognition result display section of the document processing apparatus according to the present invention.

Assume that this document image 501 is received by the image input section 101 and temporarily stored in the input image storing section 102, and region extraction is performed by the region extraction section 103. The result is shown in FIG. 8. An image obtained upon region extraction is output and displayed on the display screen.

More specifically, FIG. 8 shows region data 501a output onto the screen of a display unit such as a CRT or a liquid crystal display panel as contents obtained with region data display processing (that is, region data display processing in step ST205 in FIG. 2) performed by the region recognition result display section 105 of the document processing apparatus of the present invention. An image divided in units of regions is displayed on the screen.

More specifically, the document image 501 shown in FIG. 7 is input. With region extraction processing, it is recognized that five regions 502 to 506 are present, as shown in FIG. 8. At this time, the region recognition result display section 105 displays, on the display screen, an image with regions enclosed with rectangular frames. This image is displayed with reference to a table (FIG. 6) in which recognized region data is stored.

The region recognition result display section 105 allows setting for disabling display of region data with importance of, e.g., "3" or less. In addition, only the data of rectangular frames representing regions can be displayed, or input image data (document image 501) can be displayed together with the data of the rectangular frames, as shown in FIG. 8.

The region recognition result display section 105 also allows setting for displaying the respective regions of image data (document image 501) itself in different colors without displaying the rectangular frames. With this processing, region data can be displayed in different colors.

In display of the rectangular frames or image data in different colors, when the regions are displayed in different colors on the basis of their types, the region type data can be informed to the user without displaying the region type data by means of words.

For example, setting is performed such that a "title region" is displayed in red, a "text region" is displayed in green, a "drawing region" is displayed in blue, and a "page number region" is displayed in purple. Assume that the region 502 is recognized as a title region, the region 503 is recognized as a text region, the region 504 is recognized as a drawing region, and the region 506 is recognized as a page number region. In this case, the rectangular frames or image data of the regions 502 to 506 are displayed in red, green, blue, and purple, respectively, so that the user can recognize the types of regions from these colors.

Processing of the region recognition result display section 105 has been described above in detail. Region data edit processing of the region edit section 106 will be described below in detail.

[Details of Region Data Edit Processing of Region Edit Section 106]

Figure 9:
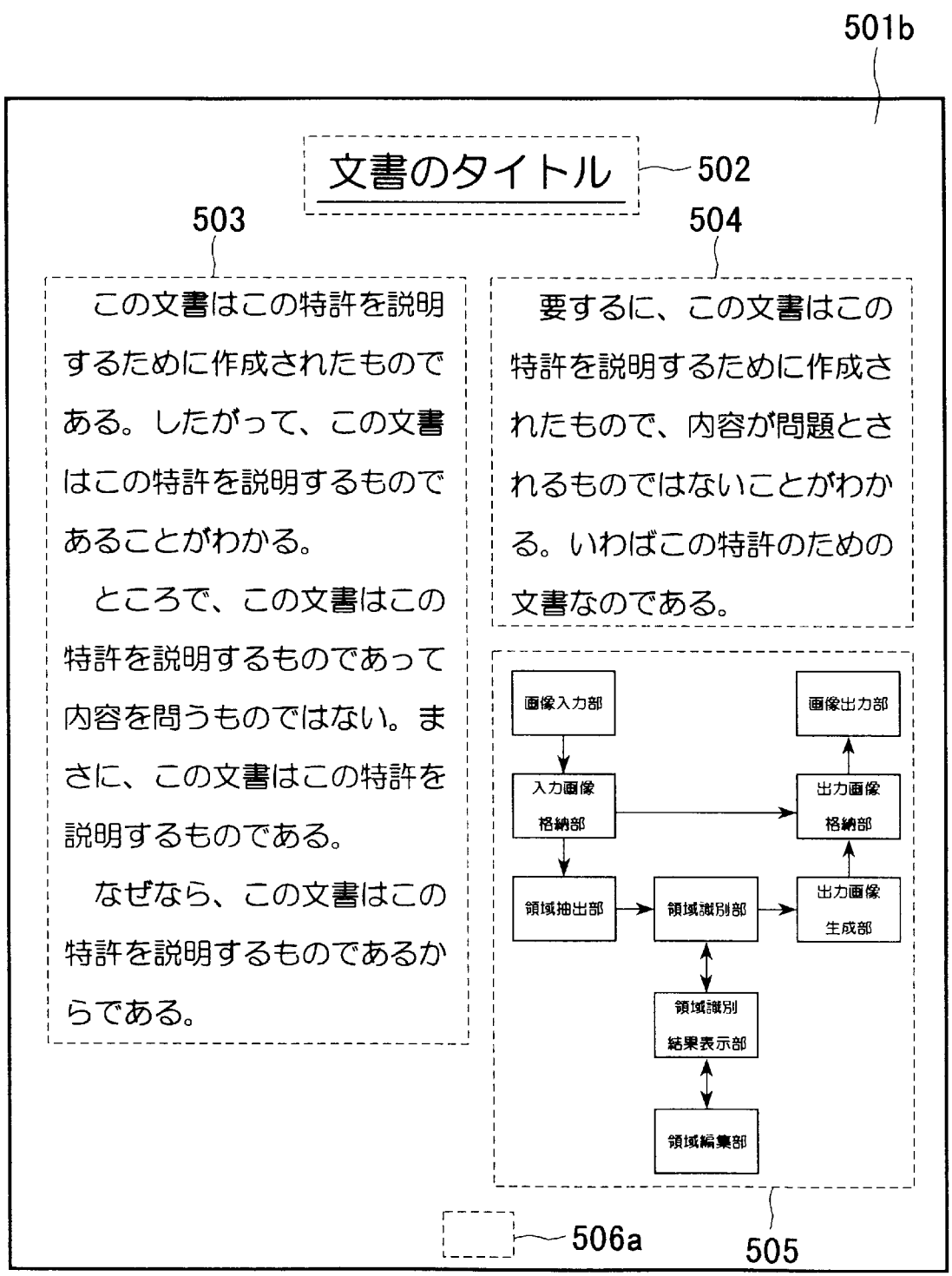
FIG. 9 is an explanatory view of region data edit processing of the document processing apparatus according to the present invention.
Figure 10:
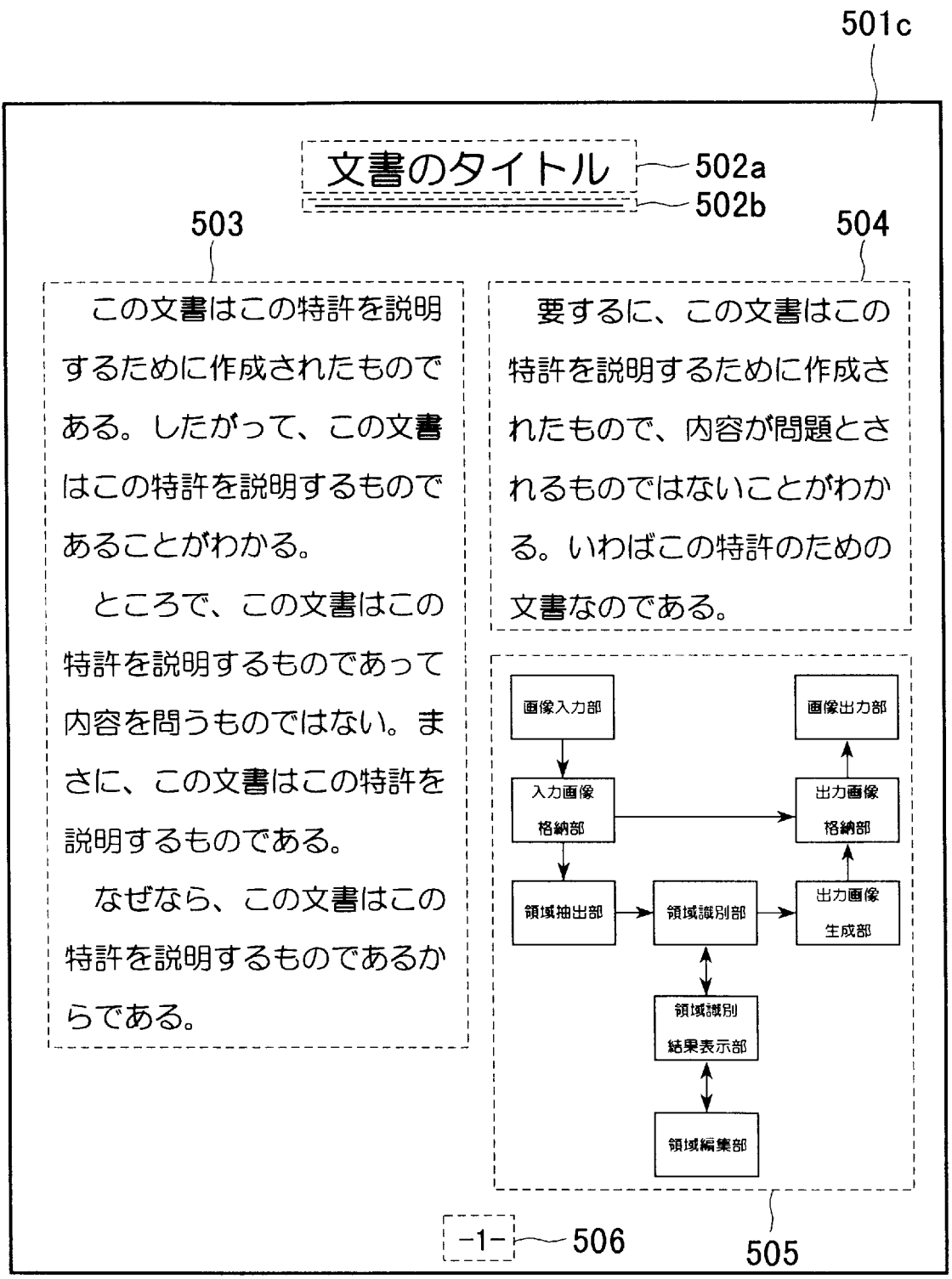
FIG. 10 is an explanatory view of region data edit processing of the document processing apparatus according to the present invention.

FIGS. 9 and 10 are explanatory views of region data edit processing in step ST206 in FIG. 2, which is performed by the region edit section 106 of the document processing apparatus of the present invention.

The region edit section 106 performs an edit operation, i.e., "region deletion", "region merge", "region division", or "region type change" of a region designated, on the display screen, by the user with a pointing device such as a light pen or a mouse in correspondence with an instruction from the user, i.e., "region deletion", "region merge", "region division", or "region type change".

More specifically, the user designates the position of a region by using a pointing device as described above while viewing the data 501a displayed on the display screen, as shown in FIG. 8. When operation contents such as deletion, division, or merge of the designated region, or region type change are instructed, the displayed region data can be subjected to various edit operations such as deletion, division, or merge of the designated region, or region type change.

For example, FIG. 9 shows edited region data 501b on the display screen as a result obtained when the page number region 506 of the region data 501a is designated, and edit processing for deletion is executed. FIG. 10 shows an edited display screen 501c as a result obtained when the title region 502 of the region data 501a is designated, and edit processing for dividing the region 502 into a region 502a of the title character portion and a region 502b of the underline portion is performed.

Actually, edit processing is performed by rewriting the table which stores region data, as shown in FIG. 6. For example, edit processing for region deletion is performed by setting the importance of the region to be low. In division, one region data is divided into two region data. In merge, two or more region data are merged into one region data. In region type change, the type of the region is changed. The position or size of region can be changed in a similar manner.

With this function, the region edit section 106 performs region data edit processing.

Figure 11:
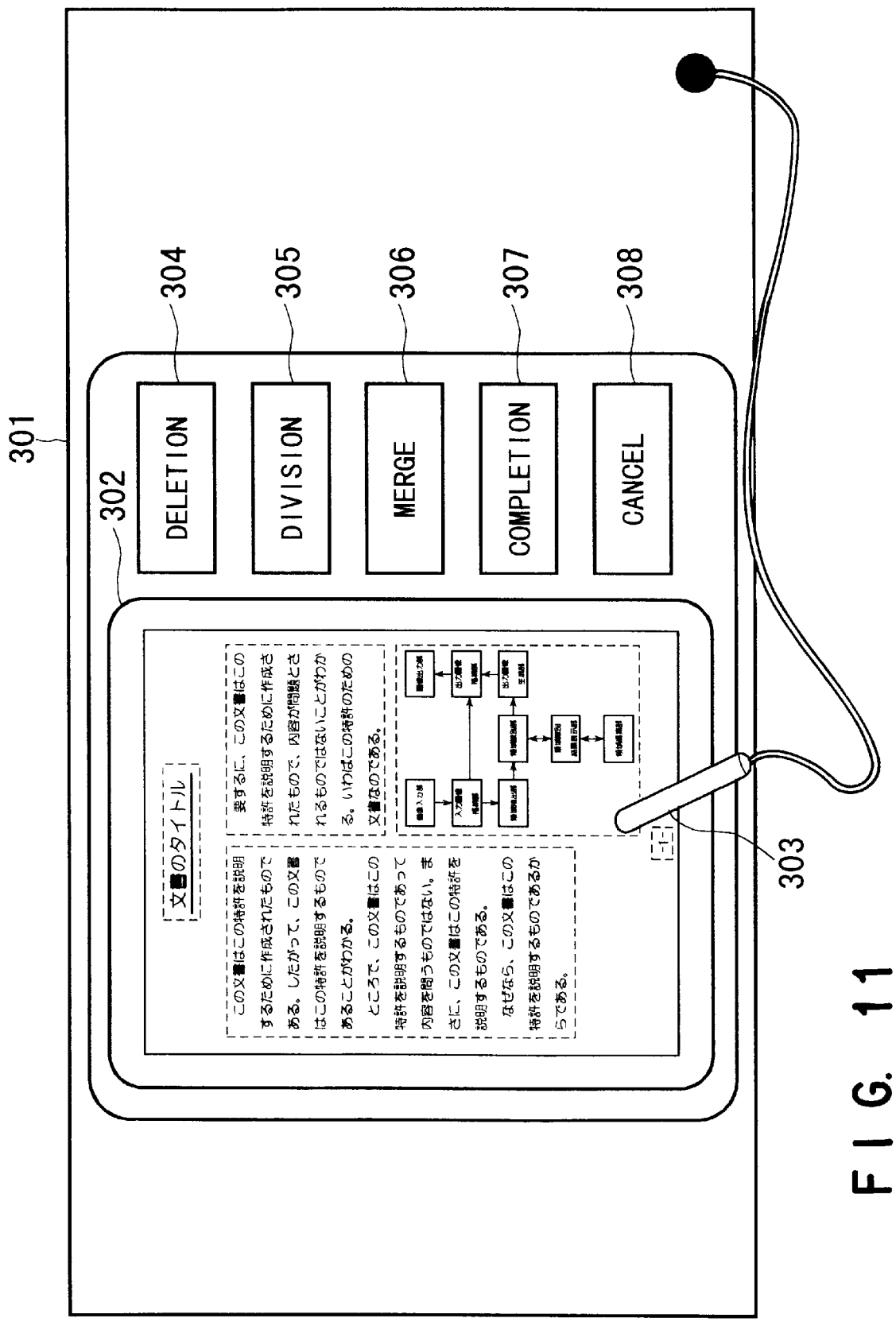
FIG. 11 is a view showing an example of a user interface for edit processing by the region edit section of the document processing apparatus according to the present invention.

FIG. 11 is a view showing an example of a user interface for performing region data edit processing (that is, processing in step ST206 in FIG. 2) of the region edit section 106 of the document processing apparatus as an example of the present invention.

The document processing apparatus has an operation panel with which the user operates the apparatus. A user interface for region data edit processing is attached to the operation panel. More specifically, referring to FIG. 11, an operation panel 301 has a liquid crystal display 302 serving as a display unit, and various operation keys 304 to 308. The operation panel 301 also has a pen input device 303.

More specifically, this user interface is attached to part of the operation panel 301 of the document processing apparatus. The liquid crystal display 302 has the pen input device 303 and the several virtual buttons 304 to 308. Region data is displayed on the liquid crystal display 302 by means of the display function of region recognition result display processing (processing in step ST205 in FIG. 2) of the region recognition result display section 105, and an edit result is displayed. The virtual buttons 304 to 308 can be arranged in the liquid crystal display 302. In this case, the buttons are operated by the pen input device 303.

With this arrangement, the user can select the edit function by depressing the virtual buttons 304 to 306. For example, when the deletion button 304 is depressed, a lamp at the button 304 is turned on to indicate that the current mode is a deletion mode. In the deletion mode, when the user designates one of the region data displayed on the liquid crystal display 302 by the pen input device 303, deletion processing as described in FIG. 9 is performed by the region edit section 106, so that the user can satisfactorily perform deletion processing.

The deletion mode continues until another button is depressed. When the division button 305 is depressed, the mode is switched to a region division mode, and the region edit section 106 is set in a mode for region division processing. In this mode, division processing of a designated region is performed, so that the user can satisfactorily divide the designated region.

In division processing, labeling processing (ST302) and connection processing (ST303) in FIG. 3 are performed again for the target region. At this time, region merge is performed while reducing the distance for connection in connection processing (ST303), thereby consequently separating the regions.

When the merge button 306 is depressed, the mode is switched to a mode for merging a plurality of regions, and the region edit section 106 merges a plurality of regions designated by the user. More specifically, in the merge mode, all regions designated by the user with the pen input device 303 are merged into one region. Region merge processing continues until the merge mode is canceled. The completion button 307 and the cancel button 308 have special functions. Upon completion of the edit operation, edit processing can be ended by depressing the completion button 307. If an erroneous operation is performed, preceding edit processing can be made invalid by depressing the cancel button 308.

With the above arrangement, upon receiving a document image, region data included in the input image can be automatically recognized, and the recognition result is displayed for the user to facilitate edit processing. When edit processing is allowed, the region data can be easily corrected even upon a failure in automatic recognition.

Output image forming processing will be described below.

[Details of Processing of Output Image Forming Section 107]

Figure 12:
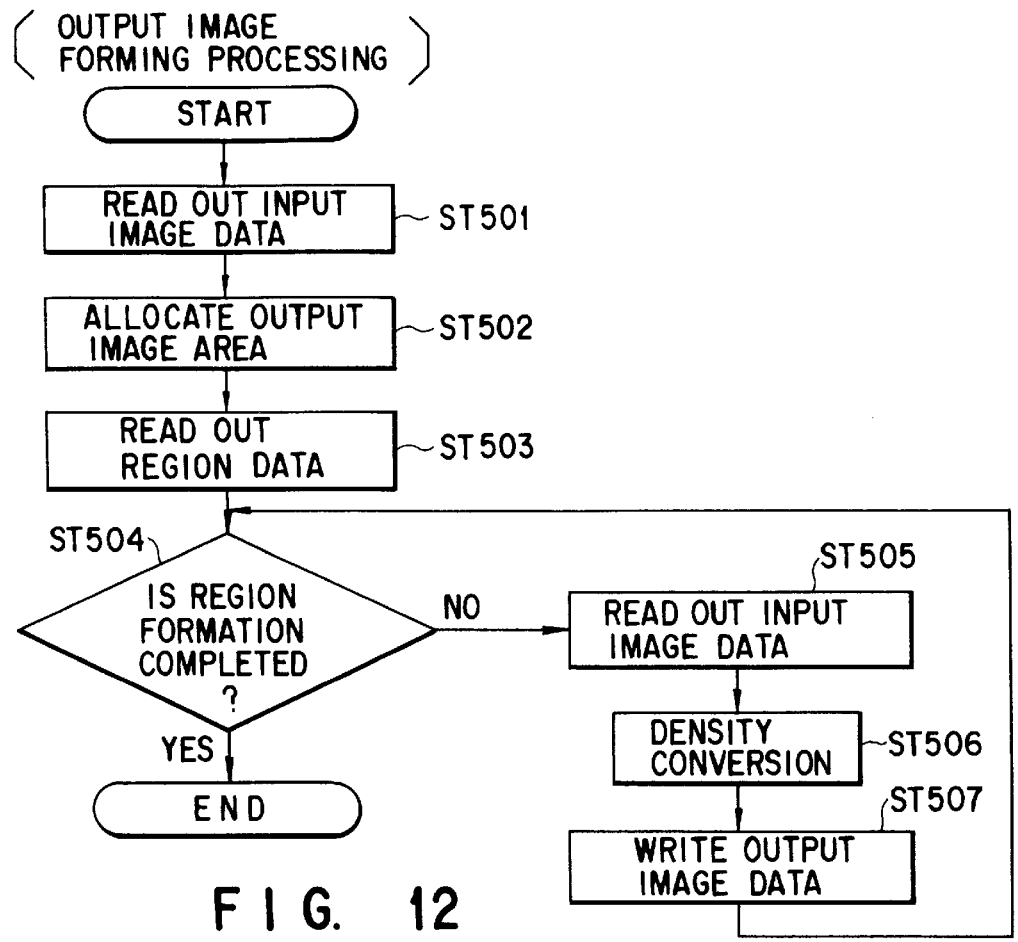
FIG. 12 is a flow chart of output image forming processing of the document processing apparatus according to the present invention.

FIG. 12 is a flow chart showing details of output image forming processing of the output image forming section 107 of the document processing apparatus as an example of the present invention, which corresponds to processing performed in step ST209 in FIG. 2. Processing will be described with reference to this flow chart.

In output image forming processing, the output image forming section 107 reads out data including the size and resolution of the input image stored in the input image storing section 102 first (ST501). In correspondence with this data, the output image forming section 107 allocates an output image area to the output image storing section 108 (ST502). Subsequently, the output image forming section 107 reads out region data as shown in FIG. 6 (ST503) and copies the image data from the input image to the output image in units of regions. This processing is continued until processing for all regions is completed (ST504).

Transfer of image data is performed in the following manner.

First, input image data positioned within the range of a region is read out from the input image storing section 102 (ST505). This image data is subjected to density conversion processing such as binarization (ST506). The processed data is written in the output image storing section 108 as output image data (ST507). Density conversion processing (ST506) can be realized by changing the density conversion value in accordance with the type and importance of the region. For example, in density conversion processing, the importance data is used, and the data of a region with importance of "5" or less is output with a density value of "0".

The density conversion method can be changed depending on the type of region. For example, binarization is performed for a text or title region. Data of a photograph region is output at the contrast level. When an output image is to be output at the contrast level, density conversion is performed such that data with a low importance is output at a low density. Various density conversion settings are possible.

In output image forming processing (ST209), the input image storing section 102 and the output image storing section 108 are defined as different areas. However, the input image storing section 102 and the output image storing section 108 may be allocated to the same area. In this case, output image area allocation processing (ST502) can be omitted. For regions which do not require density conversion processing (ST505), data read processing (ST505) and data write processing (ST507) can be omitted.

As described above, in this system, a document image is read out by the image input section 101 and temporarily stored in the input image storing section 102 as input image data. Subsequently, on the basis of the data status of the temporarily stored image data, the region extraction section 103 extracts, as a region, a unit in which characters or graphics are physically or logically connected. The region recognition section 104 measures the amounts of characteristics amounts such as the position on the corresponding image, size, shape, structure, and density distribution of the extracted region. The measurement result is recognized on the basis of predetermined rules, thereby recognizing the type or importance of the region in the document.

The recognized region data is displayed on the region recognition result display section 106 serving as a display unit such as a monitor display. In an edit mode, the user can perform an edit operation of region data with reference to the displayed contents by using the region edit section 106, so that the user can satisfactorily edit the region data. The edit result can be output as image data.

As described above, according to the system of the present invention, upon receiving a document image, image elements of different types such as a title region, a text region, a drawing region, a page region, and a photograph region included in the input image are extracted as regions. The importance of each region in the document is recognized in accordance with predetermined rules, or the recognition result is corrected. With this processing, only necessary regions such as texts and drawings in the document are output while unnecessary regions such as handwritten patterns or noise regions are deleted, and necessary portions and unnecessary portions can be properly separated and processed.

Therefore, when document image data is to be filed, or when a hard copy is to be output, the user can satisfactorily edit or adjust the image data for final use and open up new utilization and application fields.

As an arrangement for performing document image data read processing, region extraction, region recognition, edit processing, and final image output, a system configuration as an optimum basic arrangement applicable to an interface to a hard copy output device or an image filing device has been described above.

A detailed application example of an image filing system having functions including document image data read processing, region extraction, region recognition, edit processing, and final output image accumulation will be described below.

A document processing apparatus according to the second embodiment of the present invention will be described with reference to FIG. 13.

Figure 13:
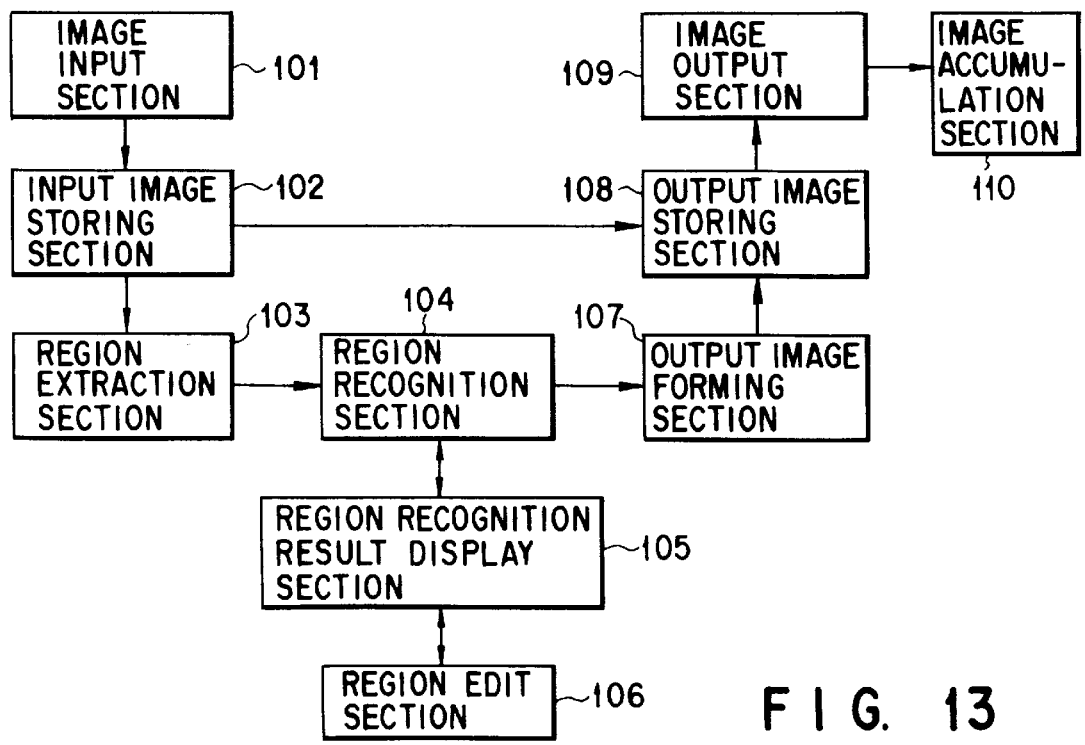
FIG. 13 is a block diagram of a document processing apparatus according to the second embodiment of the present invention.

Referring to FIG. 13, an image filing system for storing output image data as a file will be described below. This embodiment basically has the same arrangement as that shown in FIG. 1, to which an image accumulation section 110 is added.

In this embodiment, an image input section 101 reads out image data of a given document through an image input device such as an image scanner. An input image storing section 102 has a function of temporarily storing the image data read out by the image input section 101. A region extraction section 103 has a function of dividing the image data stored in the input image storing section 102 into regions in which characters or graphics are physically or logically connected and extracting each region. A region recognition section 104 has a function of measuring the characteristics of a region extracted by the region extraction section 103, i.e., the position, size, shape, and the like of the region, to recognize the type or importance of the region.

A region recognition result display section 105 has a function of displaying the image data stored in the input image storing section 102 together with the recognition data of the region recognized by the region recognition section 104. A region edit section 106 is a user interface for editing and correcting the region data displayed on the region recognition result display section 105. An output image forming section 107 has a function of changing the image stored in the input image storing section 102 by using the region data recognized by the region recognition section 104 or region data edited by the region edit section 106, thereby forming an output image. An output image storing section 108 temporarily stores the output image formed by the output image forming section 107. An image output section 109 has a function of outputting the output image stored in the output image storing section 108 to the image accumulation section 110.

The image accumulation section 110 accumulates the image data output from the image output section 109 as a file. This element is newly added as an image filing device.

With this arrangement, the functions of the image input section 101, the input image storing section 102, the region extraction section 103, the region recognition section 104, the region recognition result display section 105, the region edit section 106, the output image forming section 107, the output image storing section 108, and the image output section 109 are the same as those of the first embodiment.

The same description about details of processing as in the first embodiment is applied to the second embodiment, and only a different point will be described below. In this embodiment, however, the output image forming section 107 may have a processing function of storing a file divided in units of regions.

Output image forming processing (processing in step ST209 in FIG. 2) of the output image forming section 107 of the document processing apparatus according to the second embodiment will be described with reference to the flow chart of FIG. 14.

First, the output image forming section 107 reads out region data as shown in FIG. 6 (ST601) to form output image data corresponding to the number of readout regions. When image data forming processing for all the regions is completed (ST602), output image forming processing (ST209) is ended.

[Formation of Each Output Image Data]

Each output image data is formed in the following manner.

First, necessity of image formation of the region is checked (ST603). On the basis of the data of importance of the region, for example, when the importance of region is lower than "3", it is determined that "formation is unnecessary". For only regions with the importance of "3" or more, output images are formed (ST604).

In this manner, output image data is formed for only a region for which it has been determined on the basis of the data of the importance of region that "formation is necessary".

Next, an output image area is allocated to the output image storing section 108 on the basis of the size of the region (ST605). Input image data positioned within the range of the region is read out from the input image storing section 102 (ST606). This image data is subjected to coordinate conversion (ST607) such that the image data can fall within the output image area, and then subjected to density conversion such as binarization (ST608). The image data is written in the output image storing section 108 as output image data (ST609).

Some or all region data as shown in FIG. 6, and an attribute consisting of data representing an input image from which the image data is obtained are set for each output image data (S610). Coordinate conversion processing (ST607) or density conversion processing (ST608) can be performed in accordance with the type and importance of the region. For example, using the importance, the output image data of a region with an importance of "5" or less is formed in a reduced size.

The density conversion method can be changed depending on the type of region. For example, binarization is performed for a text or title region, Data of a photograph region is output at the contrast level. When an output image is to be output at the contrast level, density conversion can be performed such that data with a low importance is output at a low density.

Figure 14:
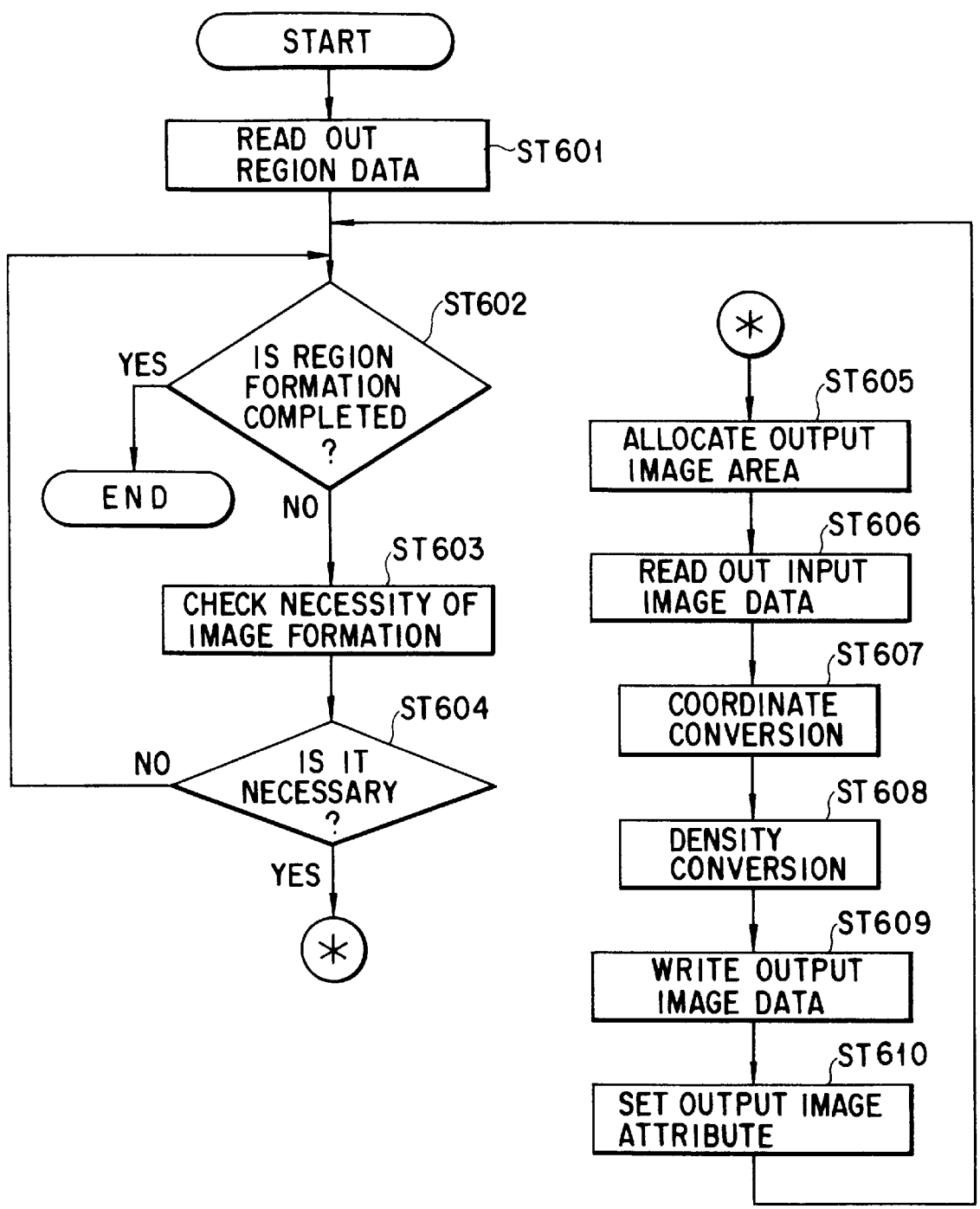
FIG. 14 is a flow chart of output image forming processing by the output image forming section of the document processing apparatus of the second embodiment.
Figure 15D:
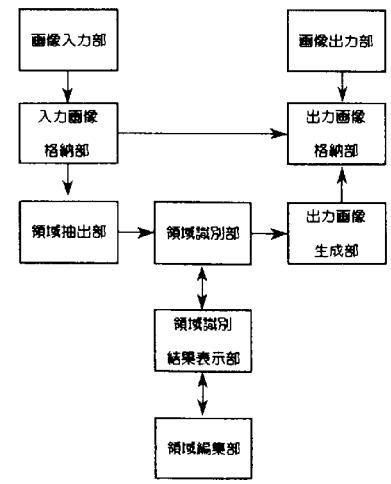

FIGS. 15A to 15D are views showing a group of output images 502 to 505 obtained when document image data 501 shown in FIG. 7 is processed using region data 501b shown in FIG. 9 following the sequence shown in FIG. 14.

As shown in FIGS. 15A to 15D, with image output processing (ST210) of the image output section 109, the group of the output images 502 to 505 is output to an image output device such as a printer or the image storing device 110 such as a hard disk.

As described above, according to the second embodiment, upon receiving a document image, elements included in the input image are extracted as regions. When the importance of each region in the document is recognized or corrected, only necessary portions can be stored as independent data in units of elements. With this processing, data obtained from the input image can be reused to form another document. At the same time, since only necessary portions are stored, the storing region can be effectively saved.

As described above, according to this system as an example, a document image is read out by the image input section 101 and temporarily stored in the input image storing section 102 as input image data. Subsequently, on the basis of the data status of the temporarily stored image data, the region extraction section 103 extracts, as a region, a unit in which characters or graphics are physically or logically connected. The region recognition section 104 measures the amounts of characteristics such as the position on the corresponding image, size, shape, structure, and density distribution of the extracted region. The measurement result is recognized on the basis of predetermined rules, thereby recognizing the type or importance of the region in the document. The recognized region data is displayed on the region recognition result display section 106 serving as a display unit such as a monitor display. In an edit mode, the user can perform an edit operation of region data with reference to the displayed contents by using the region edit section 106, so that the user can satisfactorily edit the region data and update the image of each region. The edit result including the updated image can be output as image data in units of regions of the input document image and independently filed in the image accumulation section 110.

As described above, according to the system of the present invention, upon receiving a document image, image elements of different types such as a title region, a text region, a drawing region, a page region, and a photograph region included in the input image can be independently extracted, and edited and updated in units of regions. At the same time, the images of the respective regions, including the updated image, can be separated and independently filed. Therefore, versatility is imparted to filing of document image data and utilization of the file, resulting in a wide application as a database. In addition, the importance of each region in the document can be recognized in accordance with predetermined rules, or the recognition result can be corrected. With this processing, necessary portions and unnecessary portions can be properly separated and processed.

Therefore, when document image data is to be filed, or when a hard copy is to be output, the user can satisfactorily edit or adjust the document image data for final use and open up new utilization and application fields.

As an arrangement for performing document image data read processing, region extraction, region recognition, edit processing by the user using the document image and recognized data after region extraction, and final image output, a system configuration as an optimum basic arrangement applicable to an interface to a hard copy output device or an image filing device has been described above.

However, depending on a document image, the edit operation by the user need not be performed. Region division, coordinate conversion, or density conversion is performed on the basis of the result of region recognition. Thereafter, filing of the document image data is performed, or a hard copy is output. With this processing, only necessary regions can be filed in an optimum state, or the hard copy can be output while removing unnecessary regions.

For example, when a region other than a noise region is arranged adjacent to a region which has been recognized as a noise region, these two regions are separated and independently processed. If a noise region included in an input image is large, this noise region is deleted, and moreover, a necessary document region is enlarged in accordance with the size of an output image. With such processing, the quality of an output image can be improved. In addition, the edit operation by the user after filing can be simplified.

The third embodiment will be described below.

This embodiment is a document processing apparatus which has functions of document data read processing, region extraction, region recognition, and output image formation. The region recognition function has a function of recognizing a frame-like or band-like noise region appearing at the edge of an original and discriminating the noise region from others. For data from which the noise region is removed, the document processing apparatus outputs a hard copy of the document image as an output or performs filing. A noise region appears at the edge of an original in the following situation. When an original obtained by copying an original document or a book by a copy machine, or an original read by a scanner is smaller than the paper size of the copy machine or the scanner, or when the original is set with a positional shift, a portion without the original is generated at the edge of a read region. This portion appears as a black or gray band-like or frame-like unnecessary image. Such a portion is originally unnecessary, and if it is left, the image quality is degraded. When the hard copy of a document image is to be output, the toner is wastefully used. In filing of a document image, the file capacity is increased to waste the memory resource. The third embodiment is useful for eliminating these disadvantages.

In this case, the document processing apparatus has the same arrangement as that shown in FIG. 13. However, in this image filing system, region data recognized by a region recognition section 104 is displayed for the user. In an edit mode, when removal of a portion recognized as a noise region is instructed, image data after removal and correction of the noise region is formed by an output image forming section 107 and stored in an image accumulation section 110.

Knowledge data for recognizing a black frame noise region or an outer edge noise region is added to the knowledge base of the region recognition section 104. FIG. 16 is a view showing the rule contents of the knowledge used in this embodiment. In FIG. 16, knowledge of a black frame noise region 209 and an outer edge noise region 210 is added to those described in FIG. 5.

More specifically, in the rule for the black frame noise region 209, "position" is "internal". This means that the central position or center of gravity of the region is present near the central portion of an image.

The "size" has a value close to the size of an input document image. The "shape" is of a "rectangle" which is neither laterally elongated nor vertically elongated because the size is close to the size of the input document image. The "structure" is "change exist" because the projections along the lateral and vertical directions have remarkable peaks at two ends. The "density distribution" is "non" because the contrast has no change. When these conditions are satisfied, the region is recognized as a black frame noise region.

In the rule for the outer edge noise region 210, the "position" is the "end of document". The "size" satisfies one of ranges, i.e., a width x along the lateral direction falls within a set value Wa with a margin wa as an error, or a width y along the vertical direction falls within a set value Ha with a margin ha as an error. The "shape" is indefinite. The "structure" is "change exist". The "density distribution" is indefinite. When the above conditions are satisfied, the region is recognized as an outer edge noise region.

As in the description of FIG. 5, the set values Wa and Ha are automatically determined on the basis of the size of the document image.

The operation of the document processing apparatus of the third embodiment will be described below in detail.

FIG. 17 is a view of an example of a document image to be input to the document processing apparatus of the present invention. As for the arrangement of the document image, a headline 703 is present in the document image as shown in FIG. 7, and a black frame noise region 702 is present outside the document region, thereby forming an input document image 701 as a whole.

The black frame noise region 702 may be generated in the copy process by a copy machine. In this case, since the headline portion 703 and the black frame noise region 702 are in contact with each other, it is expected that a region extraction section 103 may extract the two regions as one region. Such a region can be set for a rule as shown in FIG. 16 in the region recognition section 104 and separated from other noise components. An example of processing of a black frame noise region will be described. More specifically, a rule for detecting a black frame noise region is set as the rule 209.

Since the central position or center of gravity of the region is present near the central portion of the image, the "position" is "internal", and the "size" has a value close to the size of the input document image. The "shape" is of a "rectangle" which is "neither laterally elongated nor vertically elongated" because the size of region is close to the size of the input document image. The "structure" is "change exist" because the projections along the lateral and vertical directions have remarkable peaks at two ends. The "density distribution" is "non" because the contrast has no change.

The above rule is set in advance, and a corresponding region is recorded as a "black frame noise region". Since this region is a noise region, the importance is set low, e.g., "1".

With this arrangement, this noise region can be processed by the region recognition result display section 105, the region edit section 106, and the like of the first and second embodiments, like other noise regions.

For only a region recognized as a black frame noise region, projections along both the lateral and vertical directions are measured. The result of projections obtained in determining the "structure" for region recognition may be used.

Figure 18:
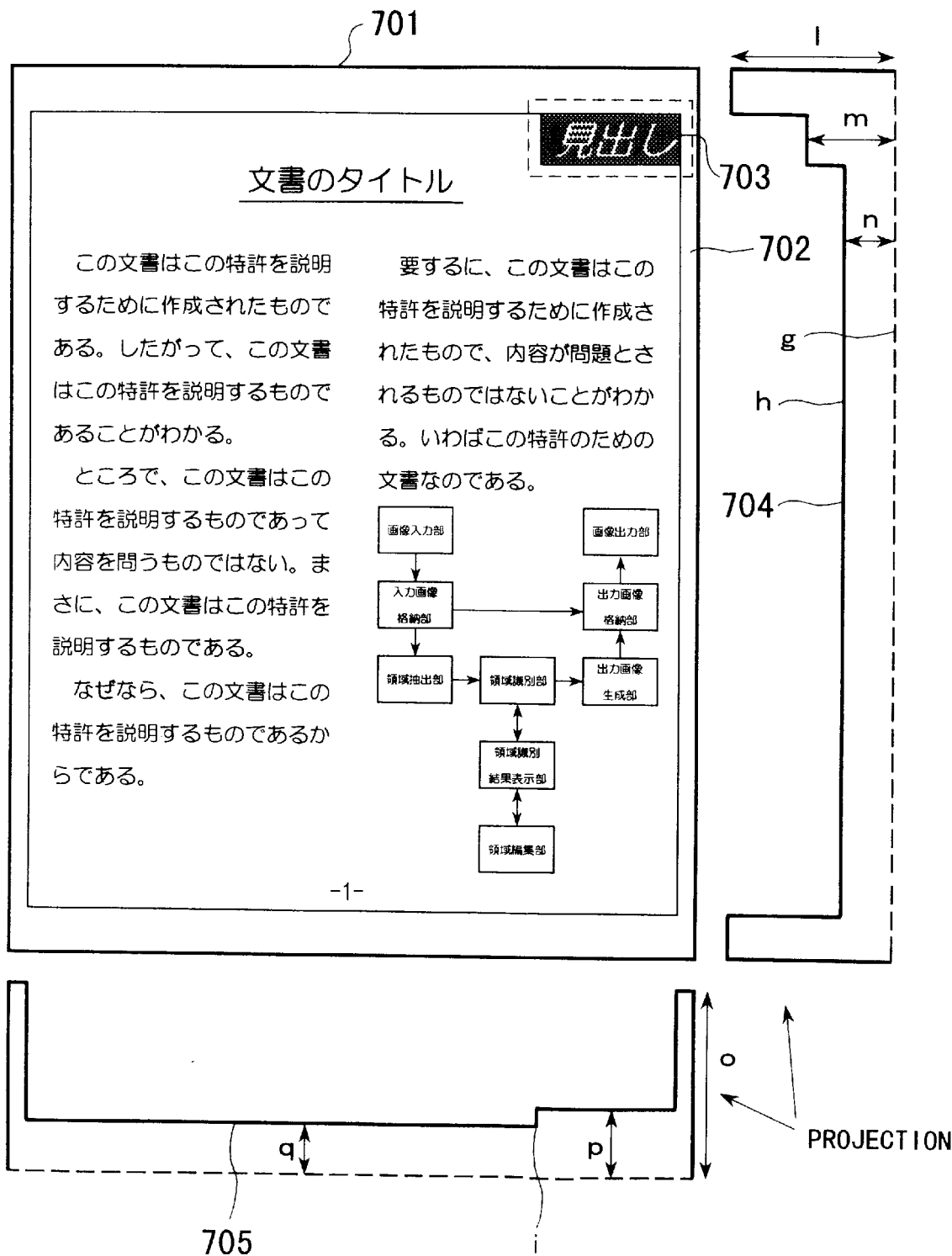
FIG. 18 is a view showing a result of measurement of projections along both the lateral and vertical directions for only the black frame noise region of the document image shown in FIG. 17.

FIG. 18 is a view showing the result of projection measurement along both the lateral and vertical directions for only the noise region 702 of the document image example 701 shown in FIG. 17. The result of projection measurement along both the lateral and vertical directions, which is obtained by counting the number of dots, is represented by profiles 704 and 705. In the output result from the region extraction section 103, the headline portion 703 is recognized as part of the black frame noise region because it is in contact with the black frame noise region.

The region recognition section 104 divides the noise region 702 from the headline portion 703 by using the projection measurement result. The projection 704 has a peak value 1, a value m at the headline portion, and a value n at the remaining portion. The projection 705 has a peak value o, a value p at the headline portion, and a value q at the remaining portion.

At this time, when a value (m−n) is larger 1/α times or more than the peak value 1, or a value (p−q) is larger 1/α times or more than the peak value o, it is recognized that a region to be divided is present. The value α may be automatically set on the basis of the size of the input document.

When it is recognized that a region to be divided is present, the position of region division is presumed. Since the projection value largely changes at a position g of the projection 704, and the value also changes at a position h, a portion between the positions g and h is presumed as a region to be divided. Similarly, since the projection value largely changes at a position j of the projection 705, and the value also changes at a position i, a portion between the positions i and j is presumed as a region to be divided. Therefore, a region enclosed by the positions g, h, i, and j is presumed as a region to be divided.

When this region is divided from the black frame noise region 702, the headline region 703 is obtained.

[Output Image Forming Processing]

Output image forming processing of the third embodiment will be described below in detail with reference to FIG. 19. FIG. 19 is a flow chart showing the detailed sequence of output image forming processing of the output image forming section 107 of the document processing apparatus.

Referring to this flow chart, the output image forming section 107 reads out the size, resolution, and the like of an input image stored in an input image storing section 102 first (ST801). An output image area is allocated to an output image storing section 108 in accordance with this data (ST802). Region data as shown in FIG. 6 is read out (ST803).

It is checked whether a "black frame noise region" is included in this region data (ST804). If YES in step ST804, document region presumption processing is performed (ST805). In document region presumption processing, a necessary region of the document image is presumed using the data of the "black frame noise region" included in the document image.

Thereafter, image data is copied from the input image to an output image in units of regions, and this processing is continued until processing for all regions is completed (ST806). Presumption of a document region is performed in the following manner.

Projections along both the lateral and vertical directions are measured for only a region recognized as a black frame noise region. Projections obtained in determining the "structure" in region recognition or projections obtained in presuming a division position in region division may be used.

Figure 20:
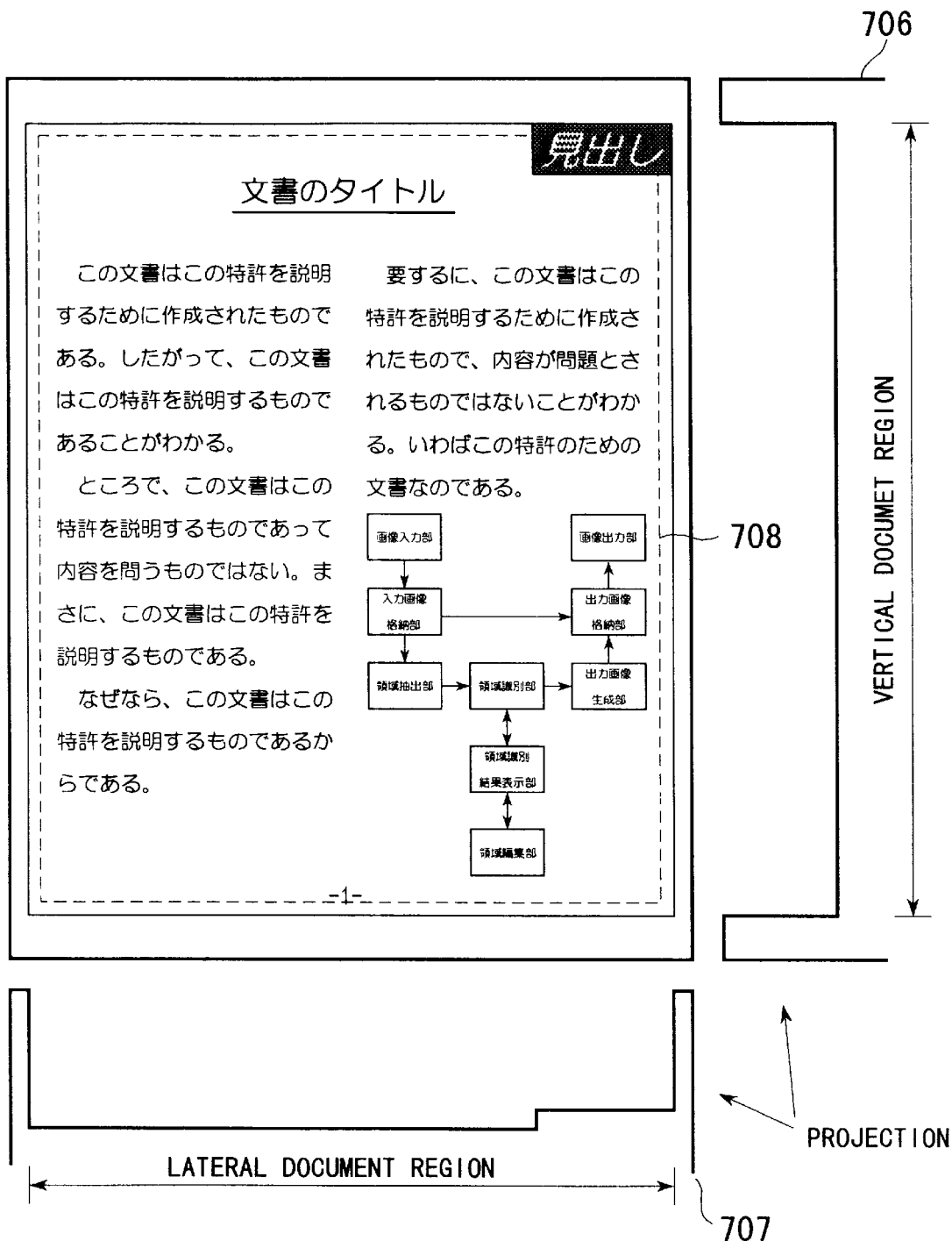
FIG. 20 is a view showing a result of measurement of projections along the lateral and vertical directions for only the black frame noise region of the document image shown in FIG. 17.

FIG. 20 is a view of a projection measurement result along the lateral and vertical directions for only the black frame noise region 702 of the document image shown in FIG. 17. Note that the headline region 703 is already separated.

When projections are measured for only the black frame noise region 702, profiles 706 and 707 are obtained. The peaks of the respective projections are obtained. Since the peaks are present outside the document region, a region inside the peaks is presumed as a document region 708.

More specifically, the document region data can be managed on the basis of the coordinate values of the document region 708. Transfer of image data is performed in the following manner. Input data positioned within the range of the region is read out from the input image storing section 102 (ST807).

Subsequently, this image data is subjected to coordinate conversion processing (ST808) and density conversion processing (ST809). With this processing, the coordinate positions are converted, or the density conversion value is changed on the basis of the type and importance of the region. For example, since the importance of the black frame noise region is low, data can be output with a density value of "0".

The document region presumed with document region presumption processing (ST805) can be enlarged in accordance with the output image size. More specifically, since the density value of the black frame noise region is "0" after density conversion processing (ST808), a blank region is output.

Therefore, the region presumed as a document region is enlarged in accordance with the output image size, i.e., enlargement processing is performed by coordinate conversion processing (ST808), thereby obtaining an output image with a higher quality. At this time, even in the document region, the density value of a region with a low importance, i.e., a region recognized as a noise region can be set to be "0" with density conversion processing.

Inversely, the output image size can be set in accordance with the size of the document region presumed with document region presumption processing (ST805). In this case, the cost for the output image region can be reduced.

Processing after output image data write processing (ST810) is the same as that of the first embodiment, and a detailed description thereof will be omitted.

Figure 21:
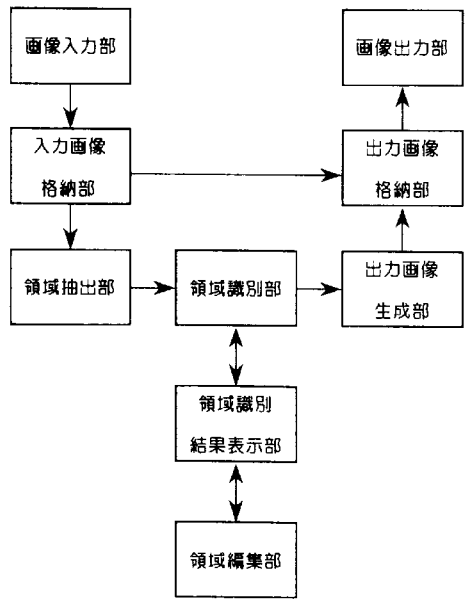
FIG. 21 is a view showing an output image obtained by processing the document image data shown in FIG. 17 in accordance with the sequence shown in FIG. 19.

FIG. 21 is a view showing an output image obtained by processing the document image data 701 shown in FIG. 17 following the sequence shown in FIG. 19. The output result shown in FIG. 21 is output to an image output device or the image storing device 110 such as a hard disk from an image output section 109.

An example of a document processing apparatus has been described above in detail, in which regions associated with each other are extracted by the region extraction section from a document image read out as image data. The regions extracted by the region extraction section are classified and separated by the region recognition section on the basis of the characteristic amounts. An output image is formed by the output image forming section in accordance with the recognition result from the region recognition section. The image formed by the output image forming section is output to the image output section. The image output from the image output section is stored in the image accumulation section.

According to this apparatus arrangement, elements included in an input document image can be extracted as regions. The importance of each region in the document can be recognized. Using data obtained from the black frame noise region, a region contacting the black frame noise region can be automatically divided, and the size of a portion which is presumed as a document region can be enlarged in accordance with the output image size. In addition, by removing a frame-like noise region which appears in the document image, the toner can be prevented from being wastefully consumed in outputting a hard copy. Furthermore, in filing, since unnecessary data can be removed, the memory resource can be effectively used.

Therefore, according to this arrangement and processing, the edit operation by the user becomes unnecessary. A region other than noise components, which is in contact with the noise components, is divided, and the noise region is removed, thereby efficiently obtaining an output image.

As an arrangement for performing document image data read processing, region extraction, region recognition, edit processing, and final image output, a system configuration as an optimum basic arrangement applicable to an interface to a hard copy output device or an image filing device has been described above.

However, the edit and adjustment operations by the user are sometimes cumbersome. Even without these functions, document image data can be filed or a hard copy can be output. The fourth embodiment having such an arrangement will be described below in detail.

The fourth embodiment according to the present invention will be described below with reference to the accompanying drawings. In this embodiment, a specific application example as an image filing system having functions of document image data read processing, region extraction, region recognition, edit processing, and final output image accumulation will be described.

A document processing apparatus of the fourth embodiment shown in FIG. 22 has almost the same basic arrangement as that of the document processing apparatus shown in FIG. 13. However, in this image filing system, image data to be stored in an image accumulation section 110 is formed by an output image forming section 107 without displaying region data recognized by a region recognition section 104 for the user and correcting the region data.

According to this arrangement, image data is stored in the image accumulation section 110 without performing region edit processing. Therefore, a system having a simple arrangement and capable of filing image data in units of regions can be obtained.

In each of the above embodiments, a system configuration as a hard copy output device or an image filing device having functions such as document image data read processing, region extraction, region recognition, final image output, file accumulation, and edit processing has been described above.

However, instead of forming an integrated system, the respective functional elements can be connected to a computer network to finally file document image data or output a hard copy. This arrangement will be described on the basis of the fifth embodiment shown in FIG. 23.

In this embodiment, functional elements such as a document image data read out/region extraction/region recognition portion, an edit function portion, and a final output image accumulation portion are constituted as independent terminal units which are connected to a computer network, thereby allowing the users of network terminals to share the image filing system.

This embodiment also has almost the same arrangement as that of the document processing apparatus shown in FIG. 13. However, in the image filing system shown in FIG. 23, image data to be stored in an image accumulation section 110 is formed by an output image forming section 107 without displaying region data recognized by a region recognition section 104 for the user and correcting the region data.

The document processing apparatus shown in FIG. 23 comprises three units, i.e., an image read unit 112, a terminal unit 113 and a filing unit 114. The image read unit comprises an image input section 101, an input image storing section 102, a region extraction section 103, the region recognition section 104, the output image forming section 107, an output image storing section 108, and an image output section 109. The terminal unit 113 comprises a region recognition result display section 105 and a region edit section 106. The filing unit 114 has the image accumulation section. The three units are connected through a network 115.

In this arrangement, processing including image read processing, region extraction, region recognition, output image formation, and image output is performed by the image read unit 112 connected to the network 115. The region recognition result is output from the region recognition section 104 and an image is output from the image output section 109 through the network 115.

The filing unit 114 is connected to the network 115. The filing unit 114 receives an image output from the image output section 109 to the network 115 and accumulates the image data as an image file.

The terminal unit 113 is connected to the network 115. Upon receiving the region recognition result and image output from the image output section 109 through the network 115, the terminal unit 113 displays the region recognition result. A region edit operation as described above can be performed to edit a desired image file.

In addition, various intelligent terminals serving as terminal units can be connected to the network 115 and used, so that the users of terminals connected to the network can variously use the system, e.g., retrieve an image file from the filing unit 114 or read out an image file and use it for document formation.

A document processing apparatus according to the sixth embodiment will be described with reference to FIG. 24. In this embodiment, an apparatus will be described, which measures the similarity of an image and excludes an image with a high similarity to that of an accumulated file, thereby preventing the similar file from being stored. For example, an image filing system which inhibits to output an image similar to an already accumulated image will be described.

Referring to FIG. 24, an image input section 101 has a function of reading out image data of a given document through an image input device 101 such as an image scanner. An input image storing section 102 has a function of temporarily storing the image data read out by the image input section 101. A region extraction section 103 has a function of dividing the image data stored in the input image storing section 102 into regions in which characters or graphics are physically or logically connected and extracting each region. A region recognition section 104 has a function of measuring the characteristics extracted by the region extraction section 103, i.e., the position, size, shape, and the like of the region, to recognize the type or importance of the region. A region recognition result display section 105 displays the image data stored in the input image storing section 102 in a superposed manner with the recognition data of the region recognized by the region recognition section 104.

A region edit section 106 is a user interface for editing and correcting the region data displayed on the region recognition result display section 105. An output image forming section 107 has a function of changing the image stored in the input image storing section 102 by using the region data recognized by the region recognition section 104 or region data edited by the region edit section 106, thereby forming an output image. An output image storing section 108 temporarily stores the output image formed by the output image forming section 107. An image output section 109 outputs the output image stored in the output image storing section 108 to a printer or an external memory. An image accumulation section 110 accumulates the image data output from the image output section 109 as a file.

A similarity measuring section 111 has a function of measuring the similarity between the output image data stored in the output image storing section 108 and the image data recorded in the image accumulation section 110. In this system, when it is determined upon measurement by the similarity measuring section 111 that image data similar to the measured image data is already recorded in the image accumulation section 110, the measured image data is not output from the image output section 109. Alternatively, when a similar image has already been recorded, the already recorded image can be replaced. With this arrangement, the details of processing performed by the respective sections 101 to 109 shown in FIG. 24 are the same as those described in the first and second embodiments. In this system, the similarity measuring section 111 measures the file contents of the image data recorded in the image accumulation section 110 and the contents of the image data of each region stored in the output image storing section 108, thereby determining the similarity.

When it is determined as a result of measurement by the similarity measuring section 111 that similar image data has already been recorded in the image accumulation section 110, the measured image data is not output from the image output section 109 or replaced with the already recorded image data. The user can select any setting through the operation panel.

Figure 25:
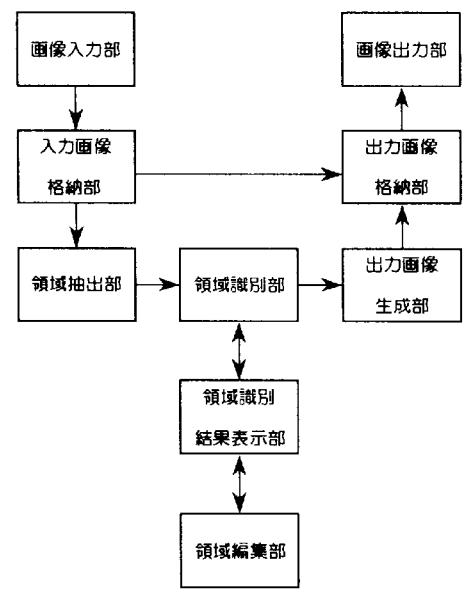
FIG. 25 is a view showing an example of a document image to be input to the document processing apparatus according to the sixth embodiment.

FIG. 25 is a view showing an example of a document image to be input to the document processing apparatus according to the sixth embodiment. A document image 601 includes e.g., a "title", a "text", and a "drawing", as shown in FIG. 25.

FIG. 26 is a view showing region data 601a output to the screen of a CRT or a liquid crystal display panel with region data display processing (processing in step ST205 in FIG. 2) performed by the region recognition result display section 105 of the document processing apparatus according to the sixth embodiment.

Assume that, when the document image 601 shown in FIG. 25 is input, the presence of four regions 602 to 604 as shown in FIG. 26 is recognized. At this time, the respective regions are displayed with rectangular frames. The display manner is the same as that described in FIG. 8.

Figure 27:
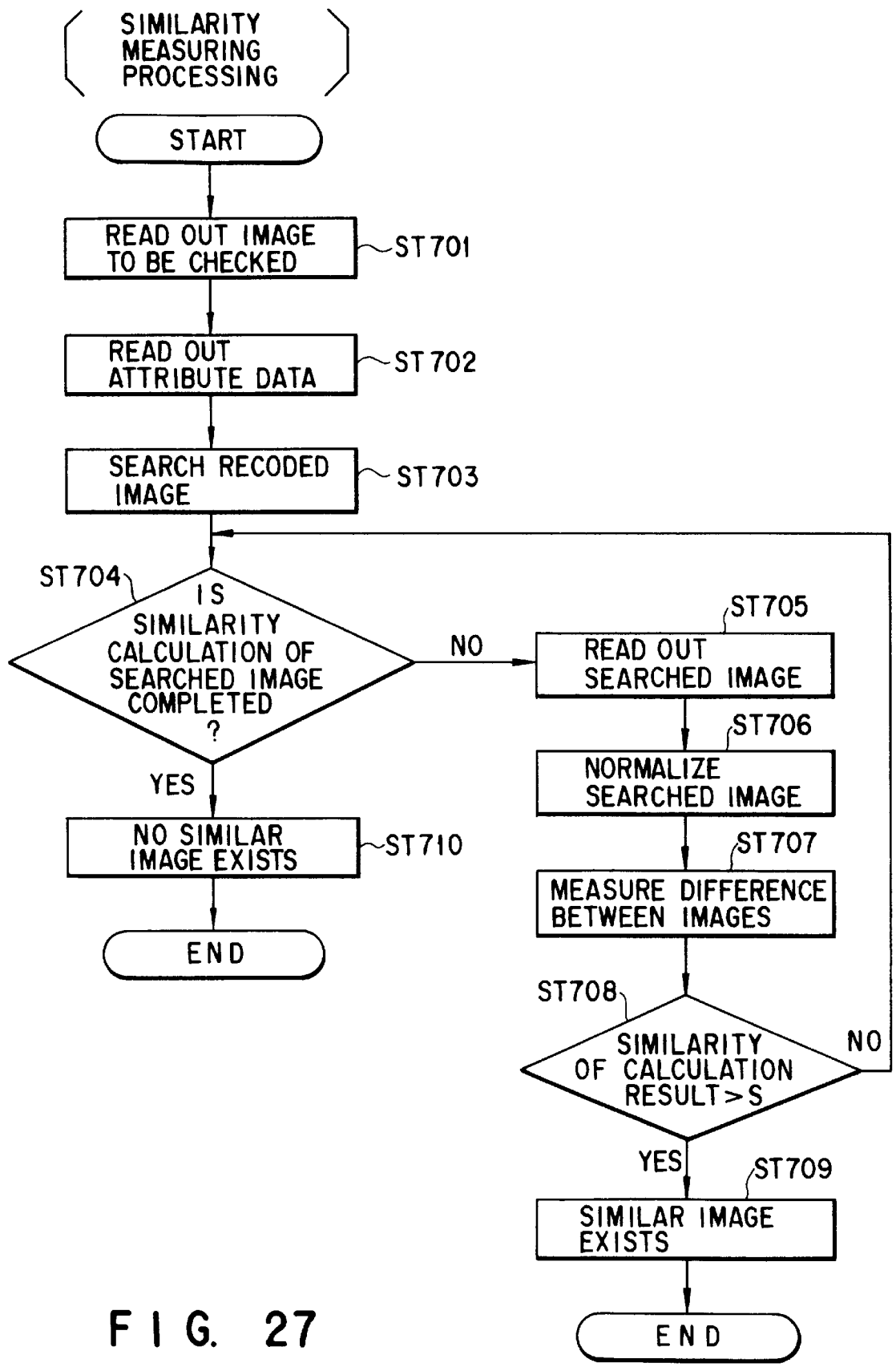
FIG. 27 is a flow chart showing the detailed processing of the similarity measuring section of the document processing apparatus according to the sixth embodiment.
Figure 28D:
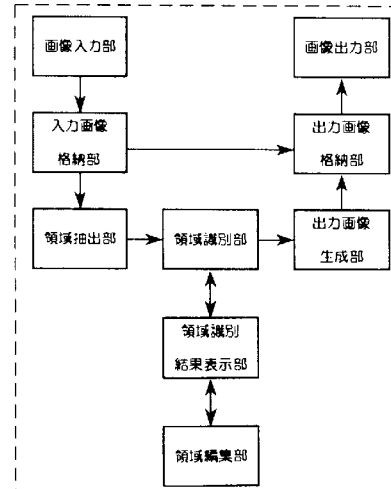

FIG. 27 is a flow chart showing processing of the similarity measuring section 111 in detail. Similarity measuring processing will be described below in detail with reference to this flow chart. The similarity measuring section 111 performs the following processing for a region image to be checked and output image data stored in the output image storing section 108, thereby checking whether a similar image has already been recorded in the image accumulation section 110.

First, the similarity measuring section 111 reads out a region image to be checked from the output image storing section 108 (ST701). Attribute data of this region image is read out (ST702). An image with similar data including the type of region is searched from images recorded in the image accumulation section 110 (ST703). The similarities of all searched images are calculated (ST704). The similarities are calculated in the following manner.

First, searched image data is read out (ST705). The image size is normalized such that the image data obtains a size equal to that of the image to be checked (ST706). The difference between the normalized image and the image to be checked is measured (ST707). For an image with contrast, measurement is performed using the difference between images. For a binary image, the difference is measured by comparing a pixel of the image to be checked with a close pixel of the searched image or performing pattern matching processing. When the region is a character data region such as a title or text region, the difference between the images can be measured by performing character recognition and comparing the character code data. On the basis of this result, the similarity is calculated (ST708). When the calculated similarity is larger than a predetermined threshold value S, it is determined that a similar image has already been recorded (ST709).

If the calculated similarity is smaller than the threshold value S, similar processing is performed for the next searched image. If no similarity reaches the threshold value S, it is determined that no similar image is recorded (ST710). If an image with a high similarity is present, both the images to be checked and the already recorded image can be displayed such that the user can decide whether the image should be newly recorded. FIGS. 28A to 28D are views showing a group of output images 602 to 605 which are files of image data in units of regions obtained by processing the document image data 601 shown in FIG. 25 by using region data 601b shown in FIG. 26 following the sequence of the system shown in FIG. 13. When similarity measuring processing shown in FIG. 27 is performed for the group of the output images 602 to 605 by the similarity measuring section 111, the similarities with respect to the image data which have already been stored in the image accumulation section 110 are measured.

Assume that four image data 502 to 505 shown in FIGS. 15A to 15D are stored in the image accumulation section 110 shown in FIG. 24 as image files.

With similarity measuring processing, it is evaluated that the similarity between the image file of the image data 505 and the output image 605 is high. The similarity measuring section 111 controls the image output section 109 such that the output image 605 is not output to the image accumulation section 110. On the other hand, when it is evaluated that the similarities of the output images 602 to 604 are low, the similarity measuring section 111 controls the image output section 109 such that the output images 602 to 604 are output to the image accumulation section 110.

Therefore, the output images 602 to 604 with low similarities are additionally output from the image output section 109 to the image accumulation section 110 such as a hard disk and recorded. Consequently, seven image data, i.e., the image data 502 to 505 and the image data 602 to 604, are stored in the image accumulation section 110.

As described above, according to the sixth embodiment, elements included in an input image are extracted as regions, and the regions are stored as independent data. At the same time, in storing, the similarity to the contents of the stored data is evaluated, and data with a high similarity is excluded such that the similar data is not stored. For this reason, upon receiving a document image, when elements included in the input image are extracted as regions, and the regions are to be stored as independent data, a database can be constituted without storing data similar to already stored data by only performing processing of measuring the difference from the already stored data. With this arrangement, a searching operation can be efficiently performed, and the storing region can be effectively saved.

In the first to sixth embodiments, a document image is read out by the image input section and temporarily stored in the input image storing section as input image data. On the basis of the data situation of the temporarily stored image data, the region extraction section extracts, as a region, a unit in which characters or graphics are physically or logically connected. The region recognition section measures the characteristic amounts such as the position on the corresponding image, size, shape, structure, and density distribution of the extracted region. The measurement result is recognized on the basis of predetermined rules, thereby recognizing the type or importance of the region in the document. When an edit function is arranged, the recognized region data is displayed on the region recognition result display section serving as a display unit such as a monitor display. In an edit mode, the user can perform an edit operation of region data with reference to the displayed contents by using the region edit section 106, so that the user can satisfactorily edit the region data and update the image of each region. The edit result including the updated image can be output as image data in units of regions of the input document image and independently filed in the image accumulation section. When no edit function is arranged, the input document image is divided into image data in units of regions on the basis of the recognized region data and output, so the image data can be independently filed.

As described above, according to the system of the present invention, when a document is to be copied or converted into image data and stored, upon receiving a document image, image elements of different types such as a title region, a text region, a drawing region, a page region, and a photograph region included in the input image are extracted as regions. The importance of each region in the document is recognized in accordance with predetermined rules, or the recognition result is corrected. With this processing, necessary portions and unnecessary portions can be properly separated and processed. Therefore, the document image can be copied or stored while removing unnecessary portions such as handwritten patterns or noise, the shade of the document, and other unnecessary portions.

In addition, upon receiving a document image, elements included in the input image are extracted as regions. The importance of each region in the document is recognized or corrected, and only necessary portions are stored as independent data in units of elements. With this processing, data obtained from the input image can be reused for another document. At the same time, since only necessary portions are stored, the storing region can be effectively saved.

When a region is to be stored as data, the difference between the data and already recorded (stored) data is measured. With this processing, a database can be constituted without storing the already recorded data again. At the same time, a search operation can be efficiently performed, and the storing region can be effectively saved.

In the above embodiments, image data is extracted from a document image in units of regions and stored as a file or used as a hard copy. However, when a document is to be read out by the image input section 101, the document as an original to be read out is sometimes set with a tilt, or the image is titled because of the distortion of the document.

In the conventional document processing apparatus, when the input document has a tilt, the tilt is detected and corrected, thereby easily understanding the structure such as a layout or performing subsequent processing of reading characters recorded on the input document. For tilt correction used at this time, various techniques have already been proposed. As described in, e.g., "One Technique for High-speed Rotation of Binary Image Based on Coordinate Calculation of Run", IEICE Transactions, D, vol. J71- D, No. 7, pp. 1296–1305, image data is converted into run length data, and a rotation matrix is decomposed to obtain conversion coordinates along the lateral and vertical directions, thereby realizing high-speed rotation processing. With this method, however, since the tilt of the entire input document image is corrected, real-time processing takes a long time. In addition, a new region (memory) for storing corrected image data must be prepared.

In the conventional document processing apparatus, when an input document image has a tilt, the cost increases in correspondence with the processing time necessary for correcting the tilt of the entire input document image, and a new storing region (memory) must be prepared.

In the seventh embodiment to be described below, a document processing method which allows to recognize regions of a document image without correcting a tilt will be described.

Figure 30:
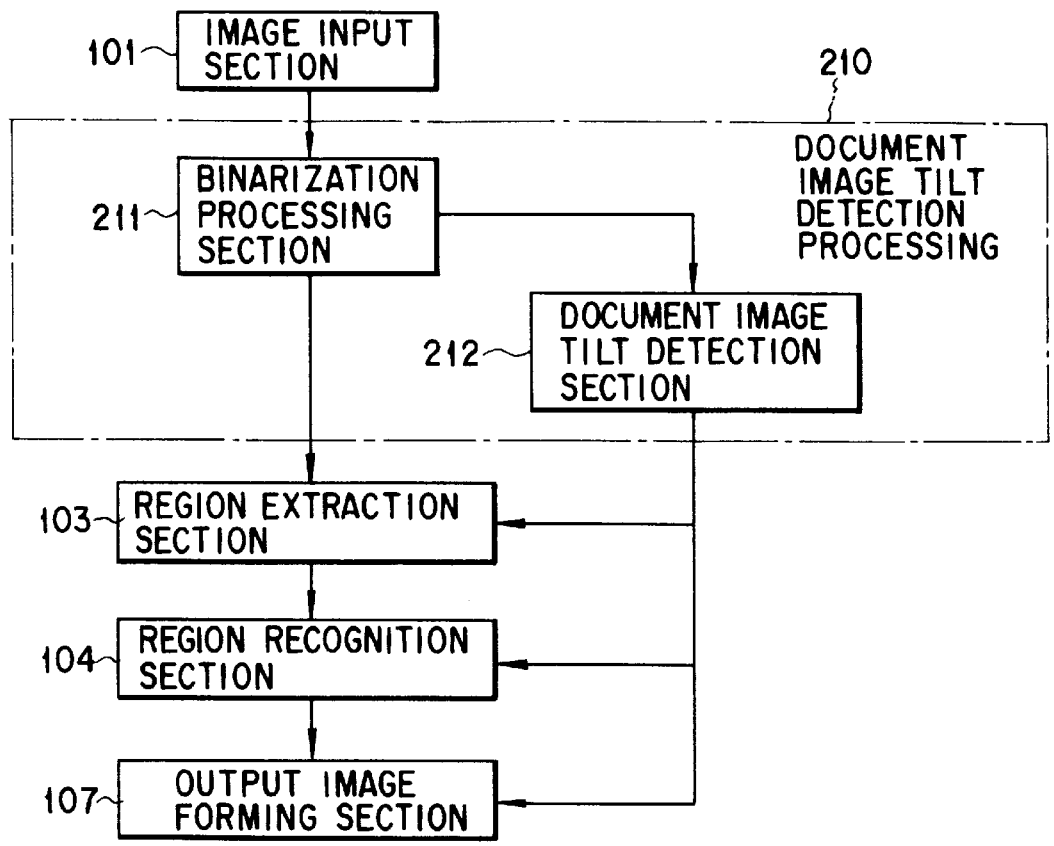
FIG. 30 is a block diagram showing the main part of the arrangement shown in FIG. 29.

Referring to FIGS. 29 and 30, an image input section 101 has a function of inputting a document to be processed as image data and comprises e.g., an image scanner. An input image storing section 102 has a memory for temporarily holding the image data read out by the image input section 101. A document image tilt detection processing section 210 has a function of detecting the tilt of the document image on the basis of the image data stored in the input image storing section 102.

As shown in FIG. 30, the document image tilt detection processing section 210 comprises a binarization processing section 211 and a document image tilt detection section 212. Of these sections, the binarization processing section 211 converts the image data input by the image input section 101 into binary data. Binarization processing performed at this time may be realized with a known technique. The binary data may be compressed in units of scanning lines along the main scanning or auxiliary scanning direction. This processing is performed for the purpose of performing subsequent processing at a high speed. For example, run length encoding may be used as a compression technique.

The document image tilt detection section 212 extracts characteristic amounts from the document image, thereby determining a tilt. A technique of detecting a tilt from the document image may be realized with a technique disclosed in, e.g., Jpn. Pat. Appln. KOKAI Publication No. 5-174183.

A region extraction section 103 divides the image data stored in the input image storing section 102 into regions in which characters or graphics are physically or logically connected and extracts the respective regions as partial regions in units of types. The region extraction section 103 also has a function of properly extracting regions along the horizontal or vertical direction with respect to the tilt of the input image stored in the input image storing section 102 by using detection data from the document image tilt detection processing section 210. A region recognition section 104 has a function of extracting the characteristic amounts (e.g., the height, the width, and the aspect ratio) of the region (partial region) extracted by the region extraction section 103, thereby recognizing the attribute of the region such as a character region, a drawing region, a photograph region, or a noise region. An output image forming section 107 has a function of performing, on the basis of the result from the region recognition section 104, deformation or density conversion in accordance with the recognized attribute, thereby forming image data. In this case, as an output device, an image display device such as a display panel or a printer can be used. Alternatively, the image data can be stored in a magnetic memory device.

This apparatus also has a region recognition result display section 105 and a region edit section 106. The region recognition result display section 105 displays the image data stored in the input image storing section 102 in a superposed manner with the recognition data of the region recognized by the region recognition section 104. The region edit section 106 edits and corrects the region data displayed on the region recognition result display section 105. These sections are the same as those described in the first embodiment. When a document image 501 as shown in FIG. 7 is input, and region extraction is performed by the region extraction section 103, the region recognition result display section 105 displays data as shown in FIG. 8.

The region edit section 106 performs an edit operation, i.e., "region deletion", "region merge", "region division", or "region type change" of a region designated, on the display screen, by the user with a pointing device such as a light pen or a mouse in correspondence with an instruction from the user, i.e., "region deletion", "region merge", "region division", or "region type change".

More specifically, the user designates the position of a region by using a pointing device as described above while viewing data 501a displayed on the display screen, as shown in FIG. 8. When an operation content such as deletion, division, or merge of the designated region, or region type change is instructed, the displayed region data can be subjected to various edit operations such as deletion, division, or merge of the designated region, or region type change. When the edit region is transferred to the region recognition section 104, the recognition result is corrected.

The output image forming section 107 is a processing function section for forming an image which reflects the recognition result, or an image which reflects the recognition result from the region recognition section 104 if no correction is performed. The output image forming section 107 has a function of performing necessary data processing for a target region image such that an image which reflects the recognition result from the region recognition section 104 is formed. An image output section 109 has a function of outputting the output image formed and stored in the output image storing section 108 to a printer or an external memory.

With this arrangement, a document to be processed as image data is supplied to the image input section 101. The input image storing section 102 temporarily holds the image data read out from the document by the image input section 101. The document image tilt detection processing section 210 detects the tilt of the document image on the basis of the image data stored in the input image storing section 102.

More specifically, as shown in FIG. 30, the document image tilt detection processing section 210 comprises the binarization processing section 211 and the document image tilt detection section 212. The binarization processing section 211 converts the image data input by the image input section 101 into binary data. The document image tilt detection section 212 extracts characteristic amounts from the document image as binary data, thereby determining a tilt. A technique of detecting a tilt from the document image can be realized with a technique disclosed in, e.g., Jpn. Pat. Appln. KOKAI Publication No. 5-174183.

The region extraction section 103 divides the image data stored in the input image storing section 102 into regions in which characters or graphics are physically or logically connected and extracts the respective regions as partial regions in units of types. The region extraction section 103 also properly extracts regions along the horizontal or vertical direction with respect to the tilt of the input image stored in the input image storing section 102 by using detection data from the document image tilt detection processing section 210. The region recognition section 104 extracts the characteristic amounts (e.g., the height, the width, and the aspect ratio) of the region (partial region) extracted by the region extraction section 103, thereby recognizing the attribute of the region such as a character region, a drawing region, a photograph region, or a noise region. The output image forming section 107 performs, on the basis of the result from the region recognition section 104, deformation or density conversion in accordance with the recognized attribute, thereby forming image data. In this case, as an output device, an image display device such as a display panel or a printer can be used. Alternatively, the image data can be stored in a magnetic memory device.

This apparatus also has the region recognition result display section 105 and the region edit section 106. The region recognition result display section 105 displays the image data stored in the input image storing section 102 in a superposed manner with the recognition information of the region recognized by the region recognition section 104. The region edit section 106 edits and corrects the region data displayed on the region recognition result display section 105. These sections are the same as those described in the first embodiment. When the document image 501 as shown in FIG. 7 is input, and region extraction is performed by the region extraction section 103, the region recognition result display section 105 displays data as shown in FIG. 8. The region recognition result display section 105 can also display the image data (document image 501) in units of regions in different colors without displaying the rectangular frames, as a matter of course. With this processing, the region data can be displayed in different colors.

The region edit section 106 performs an edit operation, i.e., "region deletion", "region merge", "region division", or "region type change", of a region designated, on the display screen, by the user with a pointing device such as a light pen or a mouse in correspondence with an instruction from the user, i.e., "region deletion", "region merge", "region division", or "region type change". More specifically, the user designates the position of a region by using a pointing device as described above while viewing the data 501*a* displayed on the display screen, as shown in FIG. 8. When an operation content such as deletion, division, or merge of the designated region, or region type change is instructed, the displayed region data can be subjected to various edit operations such as deletion, division, or merge of the designated region, or region type change. When the edit region is transferred to the region recognition section 104, the recognition result is corrected. The output image forming section 107 is a processing function section for forming an image which reflects the recognition result, or an image which reflects the recognition result from the region recognition section 104 if no correction is performed. The output image forming section 107 has a function of performing necessary data processing for a target region image such that an image which reflects the recognition result from the region recognition section 104 is formed. The image output section 109 outputs the output image formed and stored in the output image storing section 108 to a printer or an external memory, thereby ending the series of processing.

In the above manner, an input document image is binarized. The tilt of the image is detected using this binary data to obtain tilt data. In region extraction of the document image, this tilt data is used to properly correct the tilt of the region along the horizontal (X-axis) or vertical (Y-axis) direction. The attribute of the region is determined, and image data separated in units of regions is output. With this arrangement, even when a document having a tilt is read out, region extraction is performed while performing tilt correction, so that region extraction can be performed at a high speed.

In addition, region data included in the input image of an input image is automatically recognized, and the recognition result is displayed for the user to facilitate edit processing. When edit processing is allowed, the region data can be easily corrected even upon a failure in automatic recognition.

The operation of the region extraction section 103 is basically the same as that described in the first and second embodiment. In the sixth embodiment, however, the region extraction section 103 can check the tilt of the region and cope with this tilt. For this purpose, the region extraction section 103 also has the following function.

Figure 31:
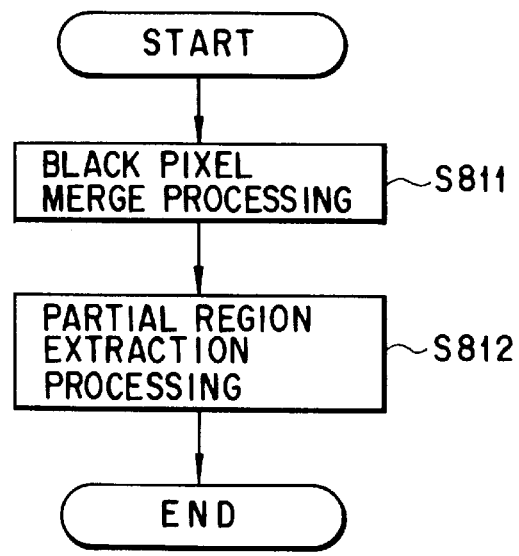
FIG. 31 is a flow chart of region extraction processing of the document processing apparatus according to the seventh embodiment.

The function of a region extraction section 103 of the seventh embodiment will be described in detail. FIG. 31 is a flow chart showing the operation of the region extraction section 103 as one element of a region recognition function element portion of the present invention.

A binarized input document image is input to the region extraction section 103.

Black pixel merge processing (S811) is performed for the binarized input document image. With this processing, white pixels having a length L and sandwiched between black pixels are converted into black pixels along the horizontal or vertical direction or along both the directions, thereby obtaining continuously arranged black pixels. By merging black pixels close to each other, the number of continuous black pixels in the entire document image is reduced.

This processing is performed for the purpose of decreasing the processing amount and increasing the recognition accuracy of the region recognition section 104 by reducing the number of regions in partial region extraction processing to be described later (S812).

At this time, the value of the length L poses a problem. The region recognition section 104 recognizes the attribute of a region by using the height, the width, and the aspect ratio obtained from the region. For this reason, when the length L has a large value, black pixels are merged beyond necessity. A region is expected to be recognized as a different attribute.

When the input document image has a relatively large tilt, character strings in different rows are merged. To the contrary, when the length L has a small value, black pixels of a photograph portion or blurred portion are not merged, and recognition may be not properly performed. Therefore, the length L preferably has a value for allowing to merge characters adjacent to each other on one row.

In partial region extraction processing (S812), labeling processing is performed in which connection between black pixels is checked to extract black pixel regions to be connected. The extracted connection black pixel regions are extracted as partial regions.

At this time, a minimum rectangle enclosing each partial region is detected. The minimum rectangle means a rectangle which completely encloses pixels constituting each partial region and minimizes a blank region where no pixel is present. The minimum rectangle detection method may be changed in accordance with a tilt q as an output from the region extraction section 103. An example of the method will be described below.

Figure 32:
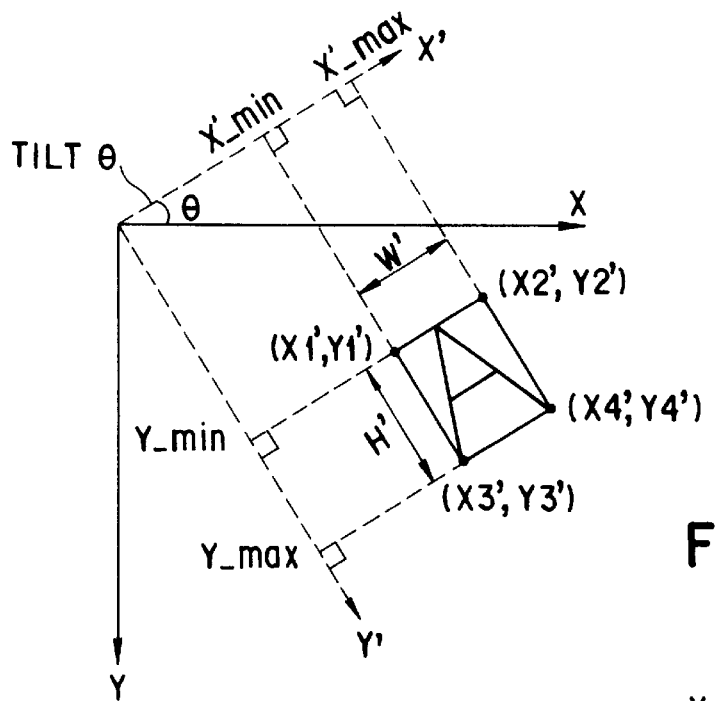
FIG. 32 is an explanatory view of region extraction processing of the document processing apparatus according to the seventh embodiment.

FIG. 32 is a view showing the first example of a method of obtaining a minimum rectangle in partial region extraction processing (S812) as one example of the region recognition device of the present invention.

The main and auxiliary scanning directions of a document image are set on an X-Y coordinate system. When the value of the tilt q of the document image and a threshold value qt are represented as q<qt or q>qt, the horizontal and vertical directions with respect to the tilt q are set on an X'-Y' coordinate system.

The minimum value and maximum value of a partial region along the respective coordinate axes of the X'-Y' coordinate system, i.e., (X'_min, X'_max, Y'_min, Y'_max) are detected, and their intersections are defined as (X'1,Y'1), (X'2,Y'2), (X'3,Y'3), and (X'4,Y'4). These four intersections represent the minimum rectangle of the partial region on the X'-Y' coordinate system. One of the four intersections may be set as a reference point, and the differences between the adjacent points and the reference point, i.e., the width and height may be obtained.

For example, the point (X'1,Y'1) is set as a reference point, and the differences between the reference point and the points (X'2,Y'2) and (X'3,Y'3) are obtained as W' and H', respectively, as minimum rectangle data. This processing is performed for the purpose of reducing the data amount to be output as partial region data because the minimum rectangle can be represented only by the coordinate values of the reference point and the values W' and H'. When the coordinate values of the four points of the minimum rectangle on the X'-Y' coordinate system are necessary, the coordinate values may be obtained with affine transformation (reference; Junichi Hasegawa et al., "Basic Technique of Image Processing: <Introduction>", Gijutsu Hyoronsha, p. 32, (1986)).

Figure 33:
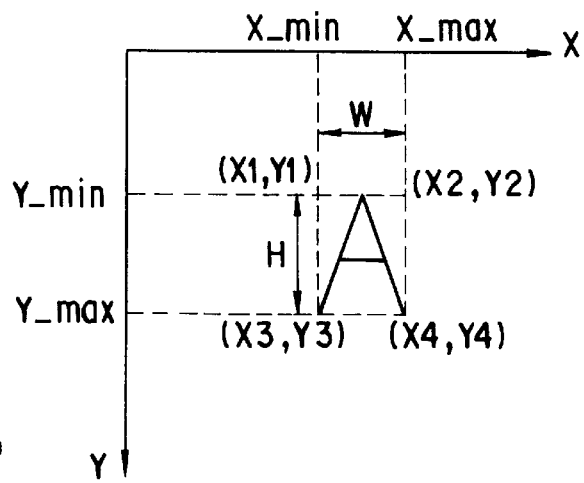
FIG. 33 is an explanatory view of region extraction processing of the document processing apparatus according to the seventh embodiment.

FIG. 33 is a view showing the second example of a method of obtaining the minimum rectangle in partial region extraction processing (S812) of the region recognition device of the present invention.

When the value of the tilt q and the threshold value qt are represented as −qt≦q≦qt, the main scanning and auxiliary scanning directions of a document image are defined along the X-Y coordinate axes. The minimum value and maximum value of a partial region along the respective coordinate axes of the X-Y coordinate system, i.e., (X_min, X_max, Y_min, Y_max) are detected, and their intersections are defined as (X1,Y1), (X2,Y2), (X3,Y3), and (X4,Y4). These four intersections represent the minimum rectangle of the partial region on the X-Y coordinate system. This processing is performed for the purpose of performing processing at a high speed when the tilt q of the document image is smaller than the threshold value qt by assuming that the document image has no tilt. As in the first example of the method, one of the four intersections may be set as a reference point, and the differences between the adjacent points and the reference point, i.e., a width and height (W, H) may be obtained and used as minimum rectangle data.

With the above methods, even when the region has a tilt as a whole or in units of characters, the minimum rectangle of the extracted region can be detected and output as partial region data together with the extracted partial region.

The region recognition section 104 will be described below. Basically, the operation of the region recognition section 104 is also the same as that described in the first and second embodiments. In the seventh embodiment, however, the operation is performed upon checking the tilt of the region. For this purpose, the region recognition section 104 also has the following function.

Figure 34:
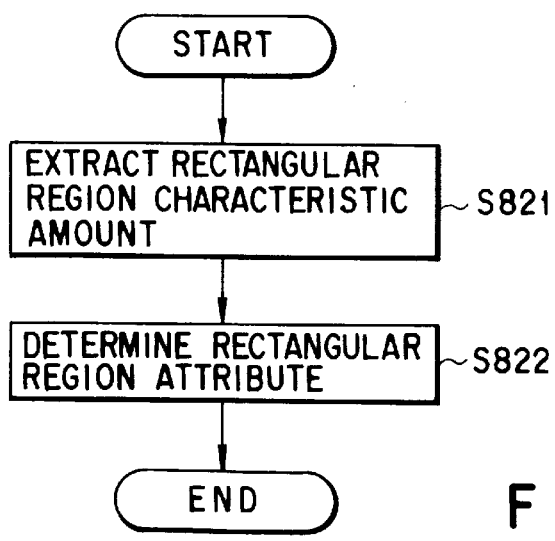
FIG. 34 is a flow chart of region recognition processing of the document processing apparatus according to the seventh embodiment.

FIG. 34 is a flow chart showing the operation of the region recognition section 104 as one element of the region recognition function element portion of the seventh embodiment.

In rectangular region characteristic amount extraction processing (S821), the characteristic amounts of all extracted partial region data are measured. The characteristics include the position on the document image, size, shape, structure, and density distribution. At least one of the amounts of these characteristics is measured. At this time, by using the minimum rectangle of each partial region data, the region can be properly recognized even when the region has a tilt.

An example of a method of measuring the characteristic amounts will be described below.

The position on the image is obtained by measuring the coordinate values, the central position, or the center of gravity of the minimum rectangle of each region. The size of a partial region is obtained by measuring the width and height of the minimum rectangle along the X and Y (or X' and Y') directions and multiplying the width by the height. The width along the X (or X') direction is obtained on the basis of the difference between the coordinate values of the leftmost pixel of the minimum rectangle and those of the rightmost pixel.

If the width (W or W') has been obtained after detection of the minimum rectangle, the obtained value is used. The height along the Y (or Y') direction is obtained on the basis of the difference between the coordinate values of the uppermost pixel of the minimum rectangle and those of the lowermost pixel. If the height (H or H') has been obtained after detection of the minimum rectangle, the obtained value is used. The shape of a partial region can be obtained on the basis of the ratio of the width along the X (or X') direction to the height along the Y (or Y') direction.

With this processing, a characteristic such as a vertically elongated partial region, a laterally elongated partial region, or an almost square partial region can be obtained. The structure of a partial region can be obtained by measuring projections along both the X and Y (or X' and Y') directions. The density distribution of a partial region is measured by forming the density value histogram of pixels in the region.

In this case, measurement is performed with reference to document image data before binarization.

In this manner, measurement of characteristic amounts is performed. Upon completion of characteristic amount measurement, rectangular region attribute determination processing (S822) is performed to allocate region attributes to all partial regions. For example, region attributes as shown in FIG. 35 and the threshold values of characteristic amounts corresponding to the region attributes are set, and the attribute of each partial region is determined with reference to this threshold value.

Referring to FIG. 35, attributes including a character region attribute, a line region attribute, a table region attribute, a drawing region attribute, and a photograph region attribute are recorded. Region attributes or characteristic amounts can be added, as needed.

In FIG. 35, "-" can have any characteristic amount measurement result.

As for a partial region determined as a character region attribute, the position on the corresponding image, shape, and density distribution can have any values. However, if the size satisfies the condition that the width along the X direction is larger than A and smaller than B, and the structure is "equalization", this means that the region is a "character region".

The values of the respective characteristic amounts in FIG. 35 will be briefly described.

"Internal" of the position means that the region is not present at the edge of the image. The edge is a range within a set value of U% from the corners of the image. The set value U is set to be, e.g., 10%. However, the value U may be changed in units of documents by obtaining the distribution of dark pixels on image data. For the size, only a width along the X direction is defined in FIG. 35, though a width along the Y direction can be simultaneously set. The width may be set along the X' or Y' direction depending on the document image. Set values A, B, C, D, E, and F are automatically determined from the size of the document image. The respective set values are evaluated on the basis of the number of pixels. For the shape, "lateral elongate" means that the width along the X direction is V times larger than the height along the Y direction. For example, a set value V is set to be "2". In a similar manner, "vertical elongate" can be defined. "Rectangle" means that the region is neither laterally elongated nor vertically elongated. More specifically, the width along the lateral direction is smaller than V times that along the vertical direction and larger than 1/V times that along the vertical direction.

For the structure, "equalization" means that projections are almost equivalent. "Extreme large change" means that a fine peak is present at one portion. "Equal interval change" means that projection has a remarkable change and very fine peaks at intervals. "Large change" means that the projection has a remarkable change and fine peaks. "Change exist" means that the projection has a remarkable change and no characteristic peaks. For the density distribution, "contrast" means that a change exists in contrast, and "non" means that no change exists in contrast.

With the above method, the attribute of each partial region can be recognized on the basis of the characteristic amounts which are measured in units of regions. A region which cannot be recognized in accordance with the predetermined threshold value can be defined as a noise attribute region.

After the attributes are allocated to all partial regions, the attribute data is added to the partial region data. By using this partial region data, an output result having a desired form can be obtained from the output image forming section 107.

At this time, by using the partial region attribute to deform the partial region or convert the density value, the output result can be processed. For example, only regions having designated region attributes can be output with the density values without processing, and the remaining regions can be deleted by setting the density values at zero. Alternatively, by setting the density values of only regions having noise region attributes to zero, a satisfactory output result can be obtained. In addition, when a designated region attribute is enlarged/reduced or moved, an output result desired by the user can be generated.

As described above, according to the seventh embodiment of the present invention, even when an input document image has a tilt, the tilt is detected, and a connection black pixel region in the input document image is extracted as a region along the horizontal and vertical directions with respect to the tilt. With this processing, partial region extraction can be properly performed. In addition, by recognizing the attribute of each region as a document element, necessary portions and unnecessary portions can be properly separated and processed. With this processing, the document image can be copied or stored while removing handwritten patterns or noise, the shade of the document, and other unnecessary portions. In addition, the toner used in outputting a copy (hard copy) or the storing region can be effectively saved.

Furthermore, since tilt data is acquired, the image of each extracted region can be processed as a region image without any tilt by correcting the tilt portion. Therefore, this embodiment has an advantage in outputting a copy (hard copy) or using a stored image.

Figure 36:
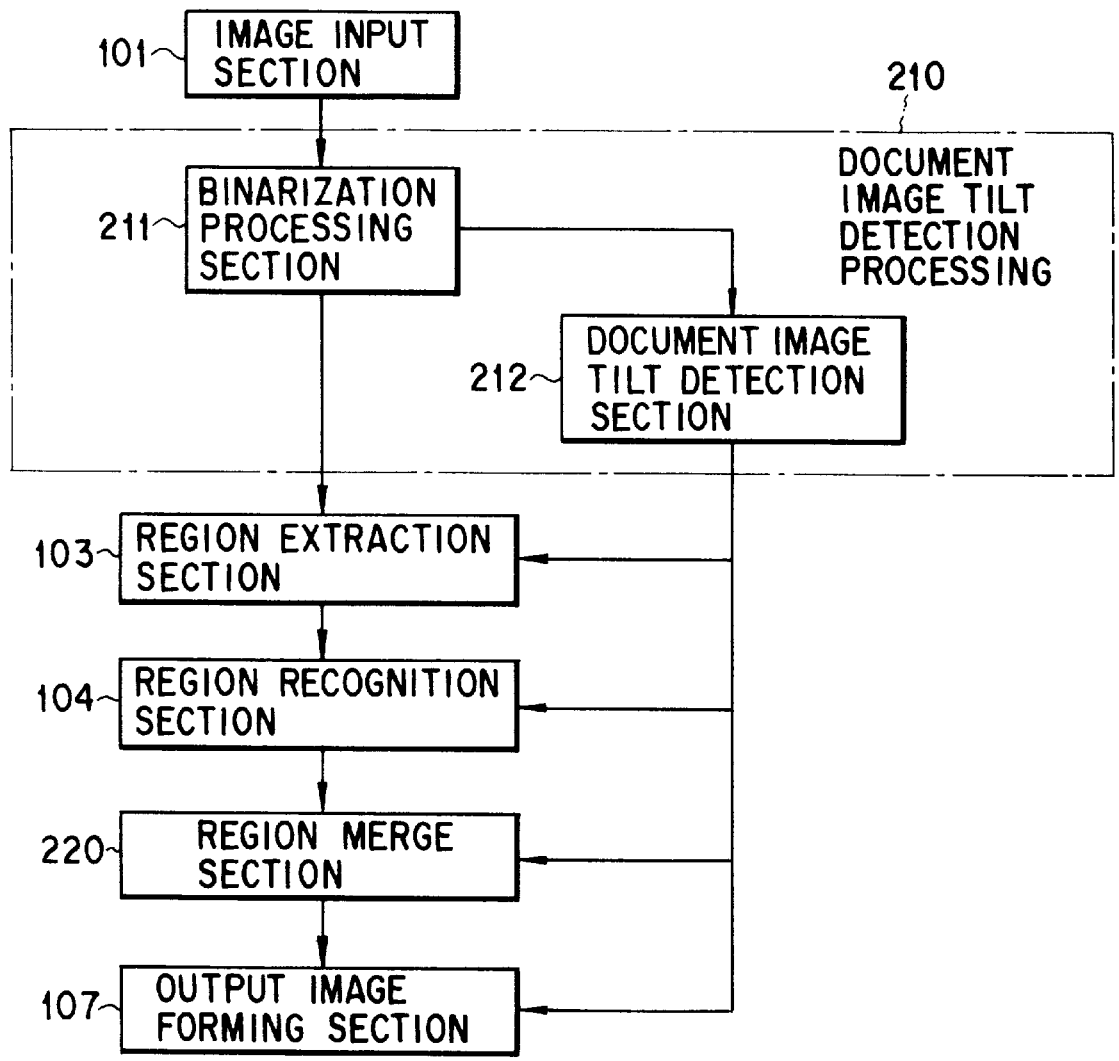
FIG. 36 is a block diagram schematically showing the arrangement of the region recognition function element portion of a document processing apparatus according to the eighth embodiment of the present invention.

A region recognition function element according to the eighth embodiment will be described below with reference to FIG. 36. The arrangement in FIG. 36 is obtained by adding a region merge section 220 to that shown in FIG. 30.

The region merge section 220 will be described below in detail.

The number of continuous black pixels of the document image is decreased with black pixel merge processing (S811 in FIG. 31). The number of partial regions to be extracted as partial regions in a normal document image is large. For example, when black pixel merge processing (S811 in FIG. 31) is performed for a row of character string, and the character string does not form continuous black pixels but is divided into a plurality of continuous black pixels, the number of partial regions to be extracted is equal to that of continuous black pixels. Therefore, the region merge section 220 merges a plurality of adjacent partial regions having the same attribute into one region to reduce the number of partial regions.

Figure 37:
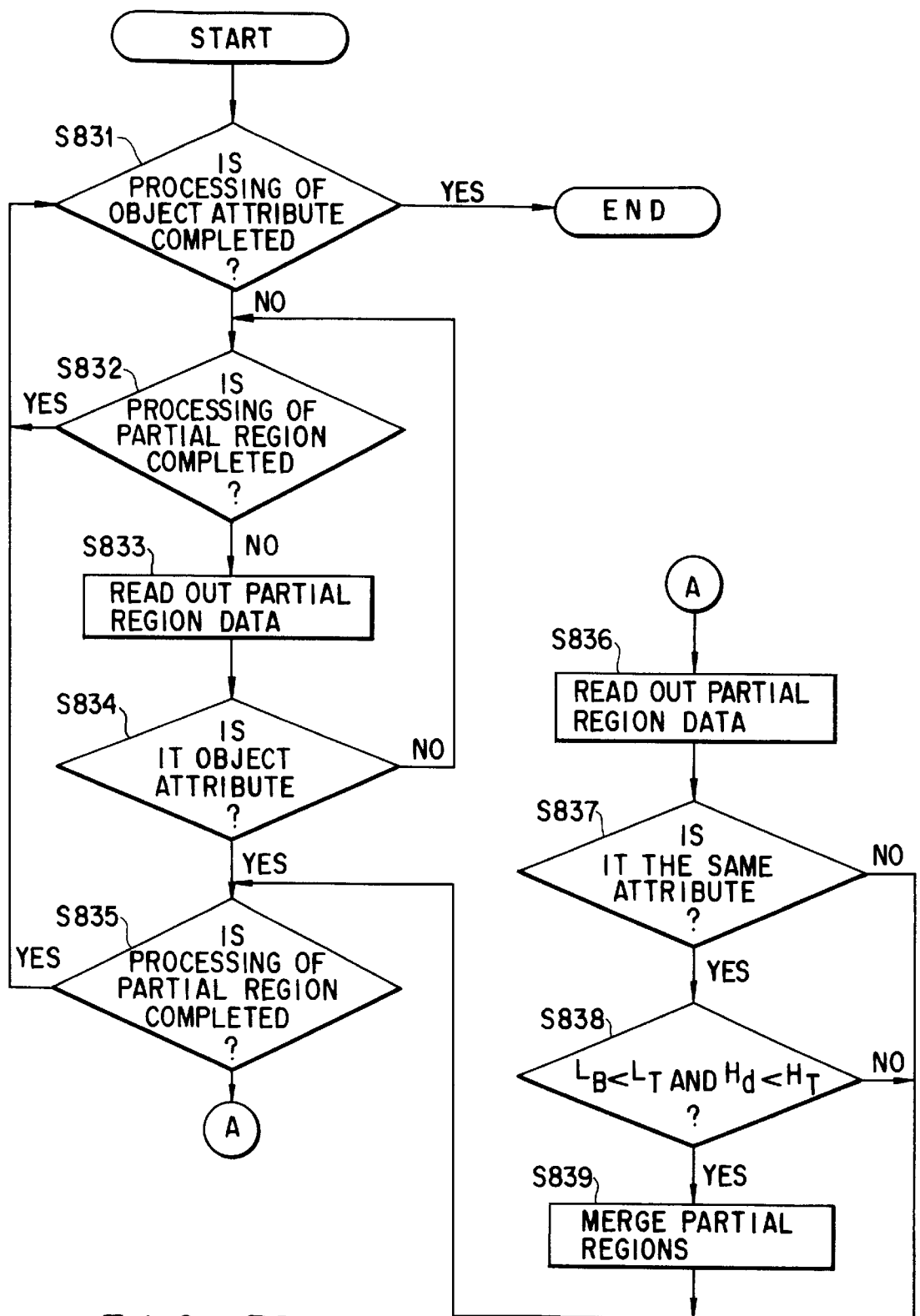
FIG. 37 is a flow chart showing processing of the region merge section of the document processing apparatus according to the present invention.

FIG. 37 is a flow chart showing processing of the region merge section 220. FIGS. 38 to 41 are views for explaining region merge conditions. Region merge processing of the region merge section 220 will be described with reference to these drawings.

A region recognition section 104 allocates attributes to all partial regions. Therefore, the region merge section 220 reads out partial region data first (S833) to find a partial region with an object attribute to be merged (S834).

Subsequently, another partial region data is read out (S836) to detect a partial region having the same attribute. If it is the same attribute, region merge conditions are calculated.

Figure 38:
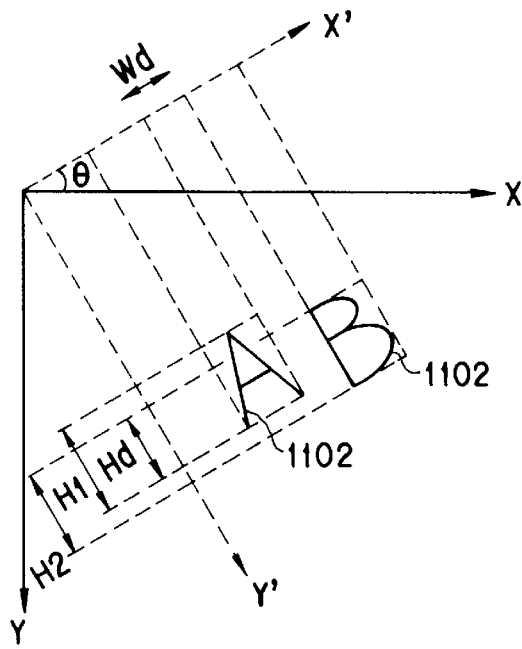
FIG. 38 is an explanatory view of region merge processing of the document processing apparatus according to the eighth embodiment.

FIG. 38 is a view showing a method of calculating the region merge conditions when partial region extraction processing (S812 in FIG. 31) is performed by the above-described first method. A height H1 is obtained from the minimum rectangle of character "A" 1101, and a height H2 is obtained from the minimum rectangle of character "B" 1102. A difference Hd between the heights H1 and H2 is obtained.

A value Wd is obtained from the minimum rectangle of the character "A" 1101 and the minimum rectangle of the character "B" 1102. The value Wd is compared with predetermined threshold values Ht and Wt. If Hd<Ht and Wd<Wt, then the region merge conditions are satisfied. Partial region merge processing for the character "A" 1101 and the character "B" 1102 is performed.

Figure 39:
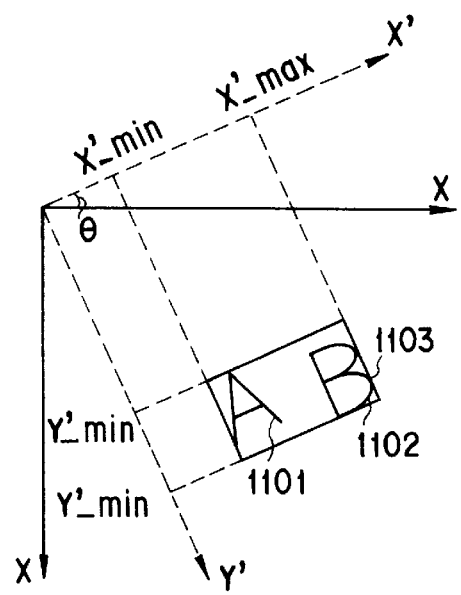
FIG. 39 is an explanatory view of region merge processing according to the eighth embodiment.

FIG. 39 is a view showing a state after partial region merge processing. With partial region merge processing, the minimum rectangle is changed, so that the data must be updated. The maximum and minimum values of a new partial region (1103) along the respective coordinate axes of the X'-Y' coordinate system, i.e., (X'_min, X'_max, Y'_min, Y'_max) are obtained from the data of the minimum rectangles of the character "A" 1101 and the character "B" 1102. The intersections are defined as (X'1,Y'1), (X'2, Y'2), (X'3,Y'3), and (X'4,Y'4). When a new minimum rectangle is obtained, the partial region data is updated.

In the above example, region merge processing along the X (or X') direction has been described. However, region merge processing along the Y (or Y') direction can be performed in a similar manner. In addition, by combining both the methods, region merge processing along both the directions may be performed.

Figure 40:
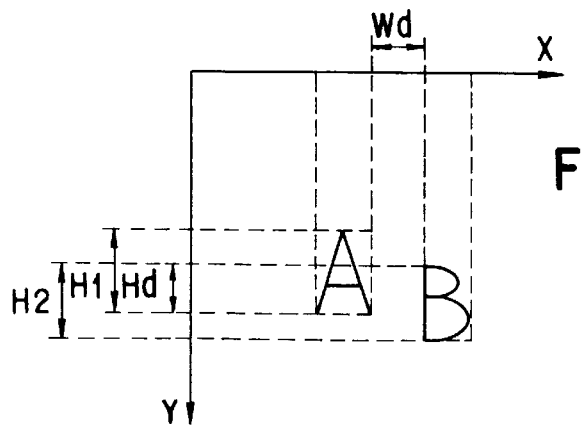
FIG. 40 is an explanatory view of region merge processing according to the eighth embodiment.

FIG. 40 is a view showing a method of calculating the region merge conditions when partial region extraction is performed with the above-described second method in partial region extraction processing (S812 in FIG. 31). In this calculation method, when the region merge conditions are satisfied, partial region merge processing is performed, as in the first method.

Figure 41:
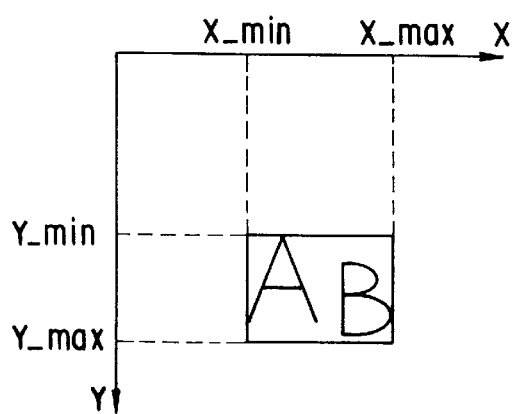
FIG. 41 is an explanatory view of region merge processing of the document processing apparatus according to the eighth embodiment.

FIG. 41 is a view showing a state after partial region merge processing. The partial region data is updated, as in the first method.

As described above, according to this embodiment, a plurality of adjacent partial regions having the same attribute are merged, thereby decreasing the number of partial regions. With this processing, the number of partial regions can be decreased, so that processing of an output image forming section 107 can be performed at a higher speed.

FIG. 42 is a block diagram showing a region recognition device according to the ninth embodiment of the present invention. The arrangement in FIG. 41 is obtained by adding a region tilt correcting section 230 to the arrangement shown in FIG. 36.

In the above embodiment, when a document image has a tilt, the tilt q is detected, and a coordinate system is defined along the horizontal and vertical directions with respect to the tilt q, thereby performing region extraction or region recognition. Without tilt correction, the output image forming section 107 forms, as output data, an image having a tilt. When tilt correction must be performed for the output result, the region tilt correcting section 230 performs tilt correction for the partial region.

The region tilt correcting section 230 performs tilt correction by using the tilt q as an output from a document image tilt detection section 212 and a method as described in "High-Speed Image Rotation Technique by Translation of Coordinates", IEICE Transactions, C, 105, 3, pp. 61–68, 1985. In this case, instead of performing tilt correction for the entire image, correction is performed in units of extracted partial regions. When the attribute of a partial region which requires correction is designated in advance, tilt correction is performed for only the partial region where tilt correction is required.

Since a region as a background without any black pixel is not subjected to correction, tilt correction can be performed at a speed higher than that for tilt correction for the entire image. For example, only a partial region having a character or drawing region attribute can be subjected to tilt correction, and tilt correction for a partial region having a noise region attribute can be omitted.

As described above, according to the ninth embodiment, a region merge section 220 is arranged in addition to a document image tilt detection section 210 for detecting the tilt of a document. On the basis of the attribute data of each separated and extracted partial region, which is obtained by a region recognition section 104, a plurality of adjacent partial regions having the same attribute are merged, thereby decreasing the number of partial regions. When an input document image has a tilt, and tilt correction must be performed, only a necessary partial region is subjected to tilt correction, instead of correcting the entire document image. Therefore, correction processing can be performed at a high speed.

Each of the above seventh to ninth embodiments has a tilt detection section for detecting the tilt of the input document image, a region extraction section for extracting the connection component region of the document image along the horizontal or vertical direction with respect to the tilt detected by the tilt detection section, thereby extracting, as a region, a unit in which characters or drawings are physically or logically connected, a region recognition section for measuring the shape of the connection component region on the basis of the data of the region extracted by the region extraction section, thereby recognizing the attribute of the region, and an output image forming section for performing deformation or density conversion in accordance with the recognized attribute, thereby forming output image data. In region extraction, the tilt of the input document is detected. A connection black pixel rectangular region is formed along the horizontal or vertical directions with respect to the tilt. The attribute such as a character, drawing, photograph, or noise region is recognized in units of regions.

More specifically, in the present invention, region recognition is performed not after correction of the tilt of the document image but on the basis of the rectangular region data having a tilt, so that processing can be performed at a high speed. Even when an image after tilt correction is to be output, only regions which require tilt correction are corrected. Therefore, tilt correction can be performed at a high speed. In addition, when the entire image is to be corrected, a new storing region (memory) is required. However, the present invention can omit the storing region.

According to the present invention, when a document is to be copied or converted into an image and stored, upon receiving the document image, the tilt of the input document image is detected, and elements included in the input image are extracted as regions along the horizontal or vertical direction. With this processing, region extraction can be properly performed. The attribute of each region as a document element is recognized. With this processing, necessary portions and unnecessary portions can be properly separated and processed. Image data can be copied or stored while removing handwritten patterns or noise included in the document, the shade of the document, and other unnecessary portions. The toner used in outputting a copy or the storing region can also be effectively saved.

In addition, upon receiving a document image, the tilt of the input image is detected, elements included in the input image are extracted as regions along the horizontal or vertical direction, and the attribute of each region as a document element is recognized. With this processing, regions having the same attribute are merged, so that the storing region can be effectively reduced.

Furthermore, when an input document image has a tilt, and the tilt is to be corrected, tilt correction is performed for extracted regions. Therefore, only necessary regions can be corrected at a high speed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A document processing apparatus comprising:

region extracting means for receiving document information read out from a document containing at least some of at least one text, at least one table, at least one drawing, at least one photography and at least one graph, and extracting a plurality of specific document regions corresponding to at least some of the text, the table, the drawing, the photography and the graph for the document information;

region recognition means for recognizing the document regions extracted by said region extraction means in accordance with types of the specific document regions;

recognition result display means for displaying images indicating a recognition result from said region recognition means;

region edit means for editing the images indicating the recognition result;

output image forming means for forming an output image corresponding to an edit result from said region edit means or the recognition result; and image output means for outputting the image formed by said output image forming means, wherein said specific document regions include data regarding a position, size, shape, structure and density distribution.

2. An apparatus according to claim 1, wherein said output image forming means includes means for discarding at least one unnecessary region from the recognized regions.

3. An apparatus according to claim 1, wherein said region recognition means includes means for measuring characteristics of the document regions extracted by said region extracting means to recognize a type or importance of the regions in accordance with predetermined rules.

4. An apparatus according to claim 1, wherein said region extracting means includes labeling processing means for labeling the document information to obtain a plurality of connection components each including a plurality of pixels, merging means for merging the connection components to form one merged element and extract it.

5. An apparatus according to claim 1, wherein said merging means connects the connection components between which there is a minimum distance between the pixels.

6. An apparatus according to claim 1, wherein said region recognition means recognizes the document regions in accordance with the position, size, shape, structure and density distribution.

7. An apparatus according to claim 1, wherein said region recognition means recognizes a region positioned at a corner of an image or an extremely small region as a noise region.

8. A document processing apparatus comprising:

region extracting means for receiving document information read out from a document containing at least some of at least one text, at least one table, at least one drawing, at least one photography and at least one graph, and extracting a plurality of specific document regions corresponding to at least some of the text, the table, the drawing, the photography and the graph for the document information;

region recognition means for recognizing the document regions extracted by said region extraction means in accordance with types of the specific document regions;

output image forming means for dividing the recognized regions into independent images and forming an output image from the independent images in accordance with a recognition result from said region recognition means; and image output means for outputting the image formed by said output image forming means, wherein said specific document regions include data regarding a position, size, shape, structure and density distribution.

9. An apparatus according to claim 8, wherein said output image forming means includes means for discarding at least one unnecessary region from the recognized regions.

10. A document processing apparatus comprising:

region extracting means for receiving document information read out from a document containing at least some of at least one text, at least one table, at least one drawing, at least one photography and at least one graph, and extracting a plurality of specific document regions corresponding to at least some of the text, the table, the drawing, the photography and the graph for the document information;

region recognition means for recognizing the document regions extracted by said region extraction means in accordance with types of the specific document regions;

output image forming means for forming an output image in accordance with a recognition result from said region recognition means;

image output means for outputting the image formed by said output image forming means; and image accumulation means for accumulating the image output by said image output means, wherein said specific document regions include data regarding a position, size, shape, structure and density distribution.

11. An apparatus according to claim 10, wherein said output image forming means includes means for discarding at least one unnecessary region from the recognized regions.

12. A document processing apparatus comprising:

region extracting means for receiving document information read out from a document containing at least some of at least one text, at least one table, at least one drawing, at least one photography and at least one graph, and extracting a plurality of specific regions corresponding to at least some of the text, the table, the drawing, the photography and the graph for the document information;

region recognition means for recognizing the document regions extracted by said region extraction means in accordance with types of the specific document regions;

recognition result display means for displaying images indicating a recognition result from said region recognition means;

region edit means for editing the image indicating the recognition result;

output image forming means for forming an output image corresponding to an edit result from said region edit means or the recognition result;

image output means for outputting the image formed by said output image forming means; and image accumulation means for accumulating the image output by said image output means, wherein said specific document regions include data regarding a position, size, shape, structure and density distribution.

13. An apparatus according to claim 12, further comprising similarity measuring means for measuring a similarity between the image output by said image output means and the image accumulated in said image accumulation means, and wherein said image output means uses the similarity measured by said similarity measuring means to determine on the basis of the degree of similarity whether the output image is similar to the image already accumulated in said image accumulation means, thereby inhibiting output of the already accumulated image.

14. An apparatus according to claim 12, further comprising associated data setting means for setting at least one of attribute data of an input image of the image accumulated in said image accumulation means and position data on the input image.

15. An apparatus according to claim 12, further comprising image encoding means for encoding the image data or forming a vector of the image data, and wherein said output image forming means encodes the image data in a region or forms the vector of the image data in accordance with the recognition result from said region recognition means.

16. An apparatus according to claim 12, wherein said output image forming means includes means for discarding at least one unnecessary region from the recognized regions.

17. A document processing method comprising the steps of:
 (a) extracting a plurality of specific document regions from document information read out from a document containing at least some of at least one text, at least one table, at least one drawing, at least one photography and at least one graph, the specific document regions corresponding to at least some of the text, the table, the drawing, the photography and the graph;
 (b) recognizing the region extracted in the region extraction step in accordance with types of the specific document regions;
 (c) displaying images indicating a recognition result obtained in the step (b) of recognizing the region;
 (d) editing the images indicating the recognition result; and
 (e) forming an output image corresponding to an edit result obtained in the region edit step or the recognition result,
wherein the step (b) of recognizing the region recognizes the region using a position, size, shape, structure and density distribution.

18. A document processing method comprising the steps of:
 (a) extracting a plurality of specific regions associated with each other from document information read out from a document containing at least some of at least one text, at least one table, at least one drawing, at least one photograph and at least one graph, the specific document regions corresponding to at least some of the text, the table, the drawing, the photograph and the graph;
 (b) recognizing the region extracted in the region extraction step in accordance with types of the specific document regions;
 (c) displaying images indicating a recognition result obtained in the step (b) of recognizing the region;
 (d) editing the images indicating the recognition result;
 (e) forming an output image corresponding to an edit result obtained in the region edit step or the recognition result; and
 (f) accumulating the image formed in the step (e) of forming an output images
wherein the step (b) of recognizing the region recognizes the region using a position, size, shape, structure and density distribution.

* * * * *